United States Patent
Zakaria et al.

(10) Patent No.: US 9,203,504 B2
(45) Date of Patent: Dec. 1, 2015

(54) SYSTEM AND METHOD FOR ENHANCED PAGING AND QUALITY OF SERVICE ESTABLISHMENT IN MOBILE SATELLITE SYSTEMS

(71) Applicant: Hughes Network Systems, LLC, Germantown, MD (US)

(72) Inventors: Gaguk Zakaria, College Park, MD (US); Channasandra Ravishankar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/034,491

(22) Filed: Sep. 23, 2013

(65) Prior Publication Data

US 2014/0045492 A1    Feb. 13, 2014

Related U.S. Application Data

(63) Continuation of application No. 13/398,763, filed on Feb. 16, 2012, now abandoned.

(51) Int. Cl.
| | |
|---|---|
| H04W 68/00 | (2009.01) |
| H04W 68/02 | (2009.01) |
| H04W 68/08 | (2009.01) |
| H04B 7/185 | (2006.01) |
| H04W 76/02 | (2009.01) |

(52) U.S. Cl.
CPC ........ *H04B 7/18539* (2013.01); *H04B 7/18543* (2013.01); *H04B 7/18567* (2013.01); *H04W 68/025* (2013.01); *H04W 76/022* (2013.01)

(58) Field of Classification Search
CPC ... H04W 68/00; H04W 68/005; H04W 68/02; H04W 68/06; H04W 68/08; H04W 68/025
USPC .................................................. 455/458, 521
See application file for complete search history.

(56) References Cited

U.S. PATENT DOCUMENTS

| | | | |
|---|---|---|---|
| 6,292,658 B1 | 9/2001 | Kim | |
| 6,763,240 B1 * | 7/2004 | Chambers et al. | ............ 455/466 |
| 7,440,763 B2 * | 10/2008 | Lundsjo et al. | ............... 455/458 |
| 2002/0123347 A1 | 9/2002 | Chambers et al. | |
| 2007/0140186 A1 * | 6/2007 | Picot et al. | ..................... 370/338 |
| 2011/0075655 A1 * | 3/2011 | Sahin et al. | ................... 370/352 |

* cited by examiner

*Primary Examiner* — Marisol Figueroa
(74) *Attorney, Agent, or Firm* — Potomac Technology Law, LLC

(57) ABSTRACT

A system and method is provided to enable enhanced paging for 3GPP IMS based Mobile Satellite Communication is presented. The method is achieved by utilizing the network requested secondary PDP context activation (NRSPCA) features of 3GPP release 7. NRSPCA involves interaction between P-CSCF, GGSN, and SGSN that eventually allows SGSN to identify the traffic type of the incoming call without looking at the compressed SIP messages. RAN can do enhanced paging, if necessary; based on the request secondary PDP context activation message, if the Paging Cause is indicating conversational class. In another embodiment, enhanced paging can be achieved by marking the packet with an appropriate DSCP code, which is done by the P-CSCF. SGSN can populate the paging cause with enhanced paging code based on the DSCP code provided or RAN can escalate paging to enhanced paging by examining the DSCP code.

12 Claims, 16 Drawing Sheets

SYSTEM AND METHOD FOR ENHANCED PAGING AND QUALITY OF SERVICE ESTABLISHMENT IN MOBILE SATELLITE SYSTEMS

This application is a continuation, and claims the benefit of the filing date under 35 U.S.C. §120, of U.S. patent application Ser. No. 13/398,763 (filed 16 Feb. 2012), the disclosure of which is incorporated herein by reference in its entirety.

BACKGROUND

The present invention relates to the field of Mobile Satellite Systems (MSS), in particular, enhanced paging techniques and Quality of Service (QoS) establishment in mobile satellite communication systems (MSS).

The majority of terrestrial cellular systems have evolved to Third Generation (3G) systems and beyond with a focus on Internet Protocol (IP) Multimedia services based on Session Initiation Protocol (SIP). SIP is a signaling protocol widely used for creating, managing and terminating sessions, such as voice calls, video conferencing, instant messaging, etc., in an IP based network. In line with the terrestrial evolution, MSS are also evolving to 3G services and beyond. The IP Multimedia Subsystems (IMS) is a key element in the 3G architecture that makes it possible to provide ubiquitous cellular access to all the services provided by the internet, for example, web, multimedia, email, video conferencing to name a few.

3G networks interface with General Packet Radio Service (GPRS) Core Network (CN) to transmit IP packets to external networks such as the internet. GPRS is a packet oriented mobile data service, which is maintained by the Third Generation Partnership Project (3GPP). 3GPP has chosen SIP and the related protocols for session establishment and management. SIP is used for signaling between a user terminal and the IMS as well as between the entities within the IMS.

In contrast to terrestrial cellular system, typical MSS operations require a line of sight (LOS) with a satellite. Typically, when a MSS user is inside a building and there is an incoming call, an enhanced paging called "Alerting" is used to notify user of an incoming call. Alerting is expensive in terms of satellite power needed to reach the users, therefore, there is a desire by MSS operators to use enhanced paging only for specific services such as voice. Since the information about the type of service is indicated inside the SIP message, which is compressed and/or encrypted by IMS elements, GPRS gateway, which is responsible for paging and alerting, cannot read the contents of SIP message. This is further explained with the help of FIG. 1.

FIG. 1 illustrates a typical mobile satellite system 100.

As illustrated in the figure, typical mobile satellite system 100 includes a satellite network 102, a terrestrial mobile network 104, and an IMS Core Network (CN) 106. Satellite network 102 further includes a User Terminal (UT) 116, which is in the coverage region of a satellite beam 108. In this example, UT 116 includes a cell phone device. UT1 116 communicates to a satellite 110 via a communication network signal 154 and to a satellite 112 via a communication network signal 156.

A GPRS gateway consisting of a Radio Access Network (RAN) 120, a Serving GPRS Support Node (SGSN) 122 and a Gateway GPRS Support Node (GGSN) 124 connects IMS CN 106 with UT 116 via satellite 110 or satellite 112.

Terrestrial mobile network 104 further includes a User Equipment (UE) 114, which is in the coverage region of a cell 118. In this example, UE 114 includes a cell phone device. A RAN 126 connects UE 114 to IMS CN 106 via a SGSN 128 and a GGSN 130.

IMS CN 106 is also connected to a telephone 150 via a Public Switched Telephone Network (PSTN) 148.

IMS CN 106 further includes a Proxy-Call Session Control Function (P-CSCF) 132, a Serving-Call Session Control Function (S-CSCF) 134, an Interrogating-Call Session Control Function (I-CSCF) 136, a Media Resource Function Controller (MRFC) 138, a Media Resource Function Processor (MRFP) 140, a Media Gateway (MGW) 142, a Media Gateway Controller Function (MGCF) 144 and a Signaling Gateway (SGW) 146. Note that IMS CN 106 only illustrates components related to SIP signaling in FIG. 1. However, for other applications, IMS CN 106 may include different components. Additionally, all the components of MSS 100 are known in the art; therefore, their functionality is not discussed in detail in this application.

RAN 120 is operable to communicate to satellite 110 via a network signal 158 and to satellite 112 via a network signal 160. RAN 120 is also operable to communicate with SGSN 122.

SGSN 122 is operable to transfer data packets to and from UT 116 within its geographical area. Some of the non-limiting functions of SGSN 122 include packet routing and transfer, authentication and charging functions of GPRS mobiles, mobility management and logical link management. The location register of SGSN 122 stores location information (for example, current cell, current Visitor Location Register) and user profiles of all GPRS users registered with SGSN 122.

GGSN 124 is responsible for sending user packets to external IP based networks and routing packets back to the mobile user. GGSN 124 is operable to convert GPRS packets coming from SGSN 122 into the appropriate Packet Data Protocol (PDP) format and sends them out to corresponding packet data network. GGSN 124 has several functions, including packet inspection for detecting different types for traffic, which can be used for shaping the traffic under different network load conditions. GGSN 124 keeps a record of active mobile users attached to SGSN 122. GGSN 124 is also responsible for policy control, billing and assigning IP addresses to mobile users. When GGSN 124 receives data addressed to a specific user routed through IMS CN 106, it checks if the user is active. For example, if UT 116 is active, GGSN 124 forwards the data to SGSN 122, and if UT 116 is not active, the data are discarded.

RAN 126 is operable to connect to UE 114 via a terrestrial network signal 152, which is part of a Universal Terrestrial Radio Access Network (UTRAN). SGSN 128 is similar to SGSN 122 in operation and GGSN 130 is similar to GGSN 124 in operation.

IMS CN 106 is operable to provide mobility management, session management and transport for IP packet services in addition to functions such as billing and lawful interception.

P-CSCF 132 is the first point of contact for the IMS terminal and is operable to process SIP signaling packets. Some of the non-limiting functions of P-CSCF 132 include subscriber authentication, inspecting all signaling from the IMS terminal, compression and decompression of SIP messages, policy decision function including QoS and generating charging records. QoS profile includes different parameters such as traffic class, bit rate, error rate, transfer delay, etc. to name a few. Traffic class defines nature of traffic—mainly divided into conversational class (voice, video telephony, video gaming), streaming class (multimedia, video on demand, webcast), interactive class (web browsing, network gaming, database access), and background class (email, SMS, downloading).

S-CSCF 134 is the central node of the signaling plane. It is operable to perform session control in addition to being an SIP server. Some of the non-limiting functions of S-CSCF 134 include handling SIP registration, which allows it to bind the user location and the SIP address, inspecting all signaling messages of the locally registered users, providing routing services, enforcing the network operator policies, and deciding which application server the SIP messages will be forwarded, in order to provide their services.

I-CSCF 136 is operable to forward SIP requests or responses to S-CSCF 134. It functions as another SIP function located at the edge of an administrative domain.

MRFC 138 and MRFP 140 together constitute Media Resource Function (MRF), which provides media related functions such as media manipulation and playing of tones and announcements. MRFC 138 is operable to receive information coming from S-CSCF 134 and interpret it to control MRFP 140. MRFP 140 is operable to mix, source or process media streams in addition to managing access rights to shared resources.

MGW 142, MGCF 144 and SGW 146 function as PSTN gateway to communicate with PSTN 148. MGCF 144 is an SIP endpoint and is operable to perform call control protocol conversion. It also controls resources in MGW 142 and interfaces with SGW 146. SGW 146 interfaces with the signaling plane of PSTN 148 and is operable to transform different protocols to pass to S-CSCF 134 via MGCF 144. MGW 142 interfaces with the media plane of PSTN 148 and is part of Media Resources controlled by IMS core functions.

A session initiated from UE 114 to UT 116 goes through IMS CN 106 via UTRAN. Similarly, a session initiated from telephone 150 to UT 116 goes through IMS CN 106 via PSTN 148.

Typically, 3GPP IMS uses SIP based signaling. All the signaling to and from UT 116 goes through P-CSCF 132. Since most of the SIP messages are large, 3GPP recommends that SIP messages between UT 116 and P-CSCF 132 are compressed in order to save over-the-air bandwidth. As a result, gateway between UT 116 and P-CSCF 132, namely RAN 120, SGSN 122 and GGSN 124 will not be able to examine the contents of the signaling message between UT 116 and P-CSCF 132. In this case, the gateway will not be able to identify if the call is for voice, fax or something else, and, hence, cannot generate paging and alerting for the appropriate type of service.

When there is signaling directed to a UT, for example, UT 116, this signaling might not be delivered directly to UT 116 depending on the state of UT 116. If UT 116 is in idle mode, SGSN 122 does not have any information about UT 116; therefore, SGSN 122 will page UT 116 before delivering the signaling. UT 116 might be in a disadvantaged location that normal paging might not be able to reach UT 116.

Methods known in the art notify user in a disadvantaged location by sending a high penetration paging message on a specific channel so that user can move to a better area if the user desires. However, the present methods do not distinguish the traffic type of the incoming call.

The main problem to solve is how to identify the type of incoming call. Since SIP signaling is compressed, SGSN 122 and RAN 120 are not able to identify the traffic class. In order to discuss the procedures to establish a session between two user terminals, Policy Control and Charging (PCC) rules followed by IMS need to be discussed, which is explained with the help of FIG. 2.

FIG. 2 illustrates an example of a typical PCC architecture.

As illustrated in the figure, PCC 200 includes an Application Function (AF) 202, a Policy and Charging Rules Functions (PCRF) 204, a Policy Charging and Enforcing Function (PCEF) 206, an Offline Charging System (OFCS) 208, an Online Charging System (OCS) 210, and a Subscriber Profile Repository (SPR) 212.

Interface between different components in FIG. 2, for example, $R_x$, $G_x$, $G_y$, $G_z$ and $S_p$, are interfaces based on diameter protocol, which are known in the art and not discussed in this application. Diameter is a signaling protocol that has been specified by Internet Engineering Task Force (IETF) to perform Authentication, Authorization and Accounting (AAA) functions in IP based networks. IMS deploys diameter protocol in most central functionalities and interfaces.

AF 202 and PCRF 204 are part of P-CSCF 132 in this example. When a call or a message from a user, for example, UT 116, reaches P-CSCF 132, it is forwarded to AF 202. AF 202 is operable to determine the type of message, whether it is a phone all or a general broadcast. AF 202 forwards the message to PCRF 204 via Rx interface. PCRF 204 is operable to determine the charging rules for this message. In order to determine the charging rules, PCRF 204 communicates with SPR 212 using Sp interface, which contains the set of rules for each user including what is allowed for a particular user in terms of receiving a call. Based on the information provided by SPR 212, PCRF 204 derives the rules for what can be done with the user including the QoS and classification and forwards it to PCEF 206 via Gx interface.

PCEF 206 is operable to implement the rule derived by PCRF 204 by either allowing the call or blocking the call. PCEF 206 is a part of GGSN 124, which analyzes the user traffic and reports the measured usage to the charging system. For charging, PCEF 206 has support for both standardized charging mechanisms, off-line charging (OFCS 208) and online charging (OCS 210). PCEF 206 communicates with OCS 210 via $G_y$ interface and with OFCS 208 via $G_z$ interface. OCS 210 and OFCS 208 are responsible for billing of the call if the call is allowed. OFCS 208 is operable to provide an off-line charging system, which implies that the charging information does not influence the user or its service until the bill arrives. This methodology is also called post-paid. OCS 210 is operable to provide an on-line charging system, in which the charging information cannot influence the service rendered.

As discussed with reference to FIG. 2, all the components in PCC 200 work together to determine what the call is for, when there is an incoming call, and derive the QoS that is used for paging.

For 3GPP IMS, which uses SIP as signaling protocol, the SIP messages between P-CSCF and the mobile terminal are compressed to save the over-the-air bandwidth. Hence, the traffic type is not visible to GPRS gateway SGSN in the following two conditions: when mobile terminal is in PMM-idle (Packet Mobility Management-idle) mode, the location of UE is not known in the SGSN and paging is initiated to let known the position of UE at the cell level; and, when mobile terminal is in RRC-URA_PCH (Radio Resource Control-UTRAN Registration Area-Paging Channel) mode, SGSN knows about the position of UE, however, UE still does not have resources available so that RAN will hold the signaling coming from SGSN and page UE so that UE can set up the needed resources.

SIP is in charge of handling and establishing the initiation of a session. An SIP message mainly contains three sections detailing the session, timing and media descriptions. A Packet Data Protocol (PDP) context is created for each session initiated, which contains the desired characteristics of the specific session, including the PDP type and the demanded QoS among other parameters. A PDP context can be viewed as a set of information maintained by UT, GSSN and SGSN. It contains a PDP type that identifies the type of Packet Data Network (PDN), the PDP address, QoS information and other session information. Activating a PDP context refers to creating the PDP context at the UT, SGSN and GGSN so that UT can communicate with an entity in PDN using the PDP address maintained in the PDP context.

A secondary PDP context activation allows the subscriber to establish a PDP context with a different QoS profile to the same PDN. A 3GPP feature called Network Requested Secondary PDP Context Activation (NRSPCA), which is based on PCC of 3GPP Release 7 as discussed above, is explained further with reference to FIGS. 3A-3B to understand how NRSPCA can be applied by IMS CN 106 to outgoing or incoming calls.

FIGS. 3A-3B illustrates NRSPCA procedure for incoming calls in MSS 100.

For discussion purposes, let's assume that UT 116 is receiving an incoming call, which in one scenario is initiated by UE 114 via terrestrial mobile network 104. In another scenario, UT 116 may receive a call from telephone 150 through PSTN 148. In both the scenarios, UT 116 receives the call through IMS CN 106, which is using SIP signaling for communication.

A SIP message typically consists of a header and a message body. For 3GPP systems using SIP protocol, SIP message bodies are defined using Session Description Protocol (SDP). Note that the different steps executed in NRSPCA procedure are known in the art, therefore, not discussed in detail.

Step (1) indicates a SIP INVITE containing a SDP message arrives at AF 202 (S302).

Step (2) indicates that SIP INVITE has been received by AF 202 by sending a SIP 100 message (S304).

SDP received by AF 202 contains information about the message, for example, for a voice call it may contain information about vocoder, bandwidth, etc. AF 202 maps those parameters in to QoS (S306), which includes information about bit-rate, traffic class, error-rate, etc., in step (3).

Step (4) indicates that QoS generated by AF 202 is forwarded to PCRF 204 via Rx interface of Diameter protocol (S308).

In step (5), PCRF 204 authorizes the QoS mapping to determine whether the mapping is allowed or not (S310). For example, if the call requires 64 kb/sec and the user is only allowed to use up to 4 kb/sec, the call is rejected.

In step (6), PCRF 204 communicates with SPR 212 via Sp interface to make a profile request for the user in order to validate what is allowed for the user (S312).

SPR 212 sends a response back to PCRF 204 with the user profile via Sp interface (S314) in step (7).

In step (8), if the call is authorized, PCRF 204 forwards the QoS mapping to PCEF 206 via Gx interface of Diameter protocol (S316).

As discussed with reference to FIG. 3A, steps 1-8 for NRSPCA procedure illustrate establishing PCC rules once a session is initiated. Steps 9-20 are discussed below with the help of FIG. 3B.

Step (9) indicates that PCC rules have been enforced and GGSN 124 has all the PCC rules in place. GGSN 124 performs QoS mapping for UT 116 (S318).

GGSN 124 forwards Initiate Secondary PDP context activation to SGSN 122 via $G_n$ interface (S320) in step (10).

In step (11), assuming UT 116 is in RRC-URA_PCH mode, SGSN 122 sends secondary PDP context activation request to UT 116 through RAN 120 (S322).

At RAN 120, since UT 116 is in RRC-URA_PCH mode, request secondary PDP context activation will not be delivered yet so that UT 116 can setup the needed resources. Instead, RAN 120 will page UT 116 (S324) in step (12).

When UT 116 responds to the page, RAN 120 delivers Request secondary PDP context activation to UT 116 (S326) in step (13).

In step (14), When UT 116 receives a request to create secondary PDP context activation, it responds to SGSN 122 by sending secondary PDP context activation (S328).

SGSN 122 creates a PDP context request and forwards it to GGSN 124 (S330) in step (15).

In step (16), GGSN 124 uses Diameter CCR protocol to communicate with PCRF 204 via Gx interface to update request for UT 116 (S332).

PCRF 204 sends an update response back to GGSN 124 using Diameter CCA protocol via Gx interface (S334) in step (17).

GGSN 124 responds to SGSN 122 for create PDP context request via $G_n$ interface (S336) in step (18).

PCRF 204 communicates with AF 202 using Diameter AAA protocol via Rx interface (S338) in step (19), indicating that UT 116 has already answered. AF 202 holds the SIP INVITE.

RAN 120 performs Radio Access Bearer (RAB)/Radio Bearer (RB) setup in order to allocate resources for UT 116 (S340) in step (20).

NRSPCA procedure for incoming calls was discussed with reference to FIGS. 3A-3B. When SIP INVITE with SDP offer arrives at P-CSCF 132, with the destination of UT 116, P-CSCF 132 holds it. P-CSCF 132 then proceeds with NRSPCA procedure. Steps 3-9 discuss the processes until PCC rules are decided and forwarded to PCEF 206. PCEF 206 then sends Initiate secondary PDP context activation to SGSN 122. Assuming UT 116 is in RRC-URA_PCH mode, SGSN 122 sends Request secondary PDP context activation to UT 116 through RAN 120. At RAN 120, since UT 116 is in RRC-URA_PCH mode, Request secondary PDP context activation from SGSN 122 will not be delivered yet. Instead RAN 120 will page UT 116. When UT 116 responds to the page, RAN 120 then delivers the Request secondary PDP context activation. Steps 14-20 show the secondary PDP context activation process until UT 116 receives resource allocations in the form of RAB/RB configuration.

In 3G IMS systems where SIP signaling is used, the information about the type of service is indicated inside the SIP message. However the entities (SGSN, RAN) responsible for paging and alerting cannot read the contents of SIP message since SIP signaling is compressed and/or encrypted by IMS elements before it reaches SGSN and RAN. Hence enhanced paging based on traffic type cannot be done.

There is a need for enhanced paging (alerting) to reach users in disadvantaged location such as in a building. MSS link margins are typically insufficient for paging to reach users in such disadvantaged scenarios. Physical layer waveform along with an increase in satellite power can address this issue from a link budget perspective. However it is desirable that enhanced paging using increased satellite power is only used for traffic type and terminal type.

Many usage scenarios involve connecting one or more external UEs to wireless user terminals (e.g., 3G satellite terminals). Individual UEs establish end-to-end sessions, each requiring different QoS treatments depending on application and data rate. Appropriate QoS treatment in 3G networks (e.g., 3GPP) is provided via establishment of Secondary PDP context between the wireless terminal and core network with the knowledge of application type, data rate etc. However when an external UE generates sessions, the wireless terminal is often unable to deduce the application type and data rate due to encryption and/or compression.

A key attribute of 3G wireless system is the capability to provide differentiated QoS across applications. In order for the system to provide effective QoS differentiation across applications, the 3G system elements have to be made aware of the multiplicity of applications that a user terminal has invoked via secondary PDP contexts with appropriate QoS information elements. As described above, lack of visibility to applications will prevent user terminals from establishing secondary PDP contexts with QoS information elements that are most optimal for the application. For example, when the user terminal does not have the visibility of the application protocol such as Facsimile over IP (FoIP) and Modem over IP (MoIP), appropriate QoS cannot be established for the user terminal.

What is needed is a system and method to provide enhanced paging and optimum QoS for specific service types, in spite of not having visibility to the content of SIP message.

BRIEF SUMMARY

The present invention provides system and method to provide enhanced paging and optimum QoS for specific service types, in spite of not having visibility to the content of SIP message.

In accordance with an aspect of the present invention, a system is provided for use with an input signal, a satellite and a user terminal. The input signal corresponds to one of a first type of data and a second type of data. The satellite is in communication with the system and the user terminal. The system includes a communication portion, a determining portion and a paging portion. The communication portion can receive the input signal. The determining portion can determine whether the input signal corresponds to the first type of data or the second type of data. The paging portion can generate a first paging signal and a second paging signal, wherein the first paging signal has a first amplitude and a first waveform and the second paging signal has a second paging signal and a second waveform. The communication portion can further transmit to the user terminal, via the satellite, the first paging signal based on the determining portion determining that the input signal corresponds to the first type of data. The communication portion can further transmit to the user terminal, via the satellite, the second paging signal based on the determining portion determining that the input signal corresponds to the second type of data. Further, one of the first amplitude is less than the second amplitude and the first waveform is different than the second waveform.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
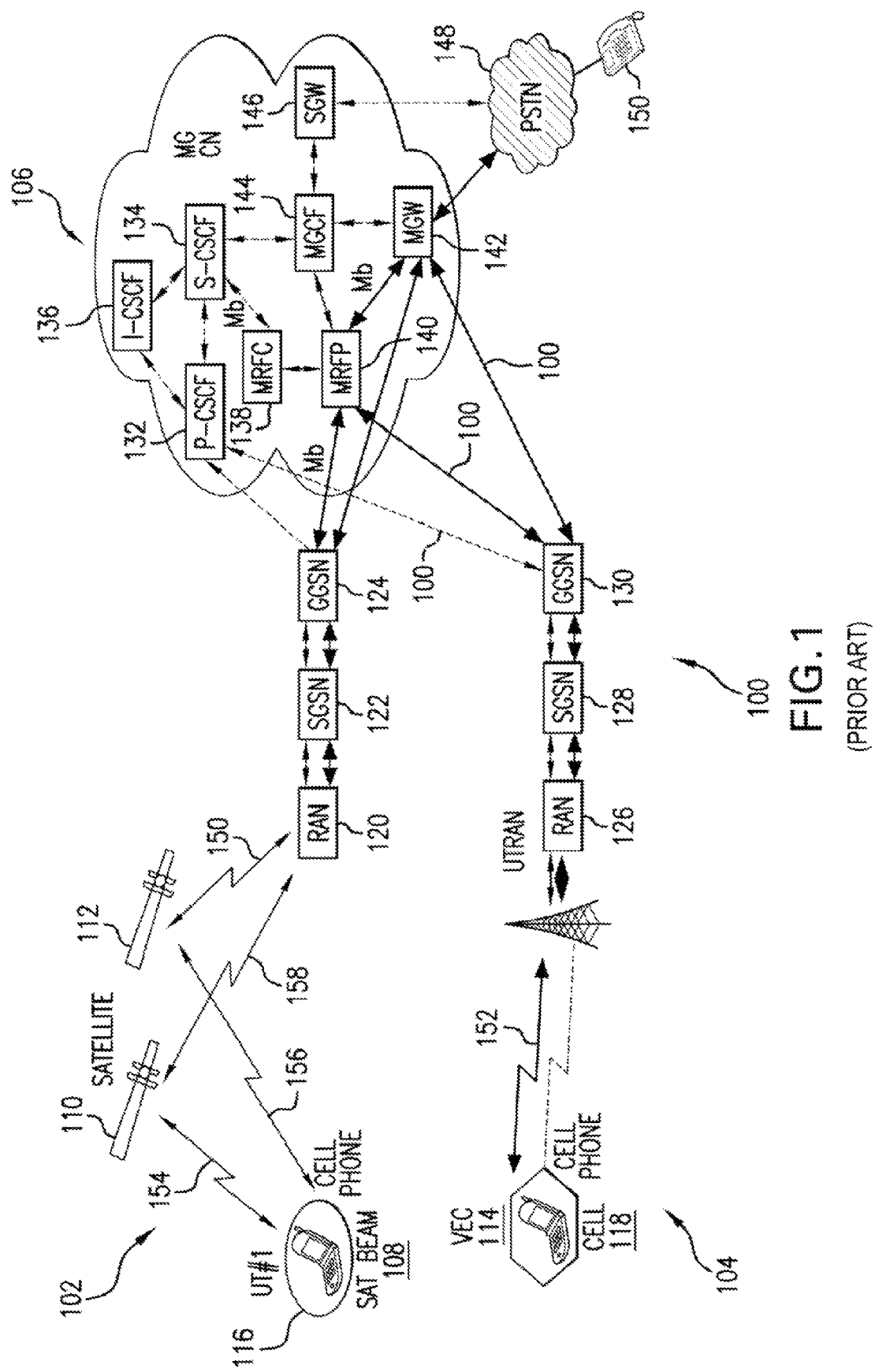
FIG. 1 illustrates a typical mobile satellite system 100.

In accordance with aspects of the present invention, a satellite communication system is able to receive an incoming signal and determine the type of the incoming signal. Based on the type of incoming signal, the system may modify a paging signal.

The present invention provides a system and method to enable the enhanced paging of a UT of a satellite communication system. The system may receive an incoming signal for a UT and determine the type of signal. For purposes of discussion, suppose a UT may receive voice calls and data texts, each having their own type of signal. In accordance with this aspect of the present invention, the system may recognize whether the incoming signal, destined for the UT, is a voice call or data text. The system will page the UT so that the incoming signal may be forwarded to the UT. In cases where the UT is unable to receive the page, for example if the user of the UT is in a building, the system may modify some aspect of the paging signal, non-limiting examples of which include amplifying the amplitude of the paging signal and changing the waveform of the paging signal. Such a modification of the paging signal may enable the UT to then receive the paging signal.

The paging aspects of the present invention may be used with a 3GPP IMS based Mobile Satellite Communication and may use such techniques judiciously for specific traffic types and terminal types. In some embodiments, such a modification of the paging signal may be performed for prescribed types of signal, as opposed to all signals. For example, the system may be configures to only amplify the paging signal, when the UT does not respond to an initial paging signal and when the incoming signal (corresponding to the page) is a voice signal.

In accordance with other aspects of the present invention, a communication device may be tethered to a UT in satellite communication system. Based on the type of incoming signal that originates from the tethered device, the system may modify a quality service.

For purposes of discussion, suppose a facsimile machine is sending a facsimile to a destination, through a UT, i.e., the UT is tethered to the facsimile machine. In accordance with this aspect of the present invention, the system may recognize the type of the incoming signal, in this case a facsimile signal. The system will be able to choose an appropriate quality of service of the communication between the UT and the destination. In cases where a plurality of qualities of services are supported by the UT and the destination, the optimal quality of service may be established. For example, the present invention provides a method by which appropriate Secondary PDP context can be established from a UT, when the UT does not have the visibility to application layer protocol. In one embodiment of the invention, these two objectives are achieved by utilizing NRSPCA feature of 3GPP release 7.

In one embodiment of the invention, NRSPCA procedure involves interaction between P-CSCF, GGSN, and SGSN that eventually allows SGSN to identify the traffic type of the incoming call without looking at the compressed SIP messages. When SIP INVITE containing SDP offer arrives at P-CSCF, P-CSCF will trigger a series of steps among P-CSCF (AF), PCRF, and PCEF (GGSN) to create request secondary PDP context activation for UT. This activation message, containing traffic class information, is sent to SGSN, so that SGSN will know the traffic class associated with the incoming signaling. If SGSN has to page the UT, SGSN will indicate the traffic class in the Paging Cause. Hence RAN will be able to do enhanced paging if the Paging Cause is indicating conversational class. If SGSN does not need to page UT, SGSN will forward request secondary PDP context activation to UT through RAN. In this case, if RAN has to page UT, RAN will be able to see the traffic class from request secondary PDP context activation. Hence RAN can do enhanced paging if necessary. Note that the method described in this document will only be used to trigger enhanced paging to the user if the incoming call is conversational class.

Figure 4:
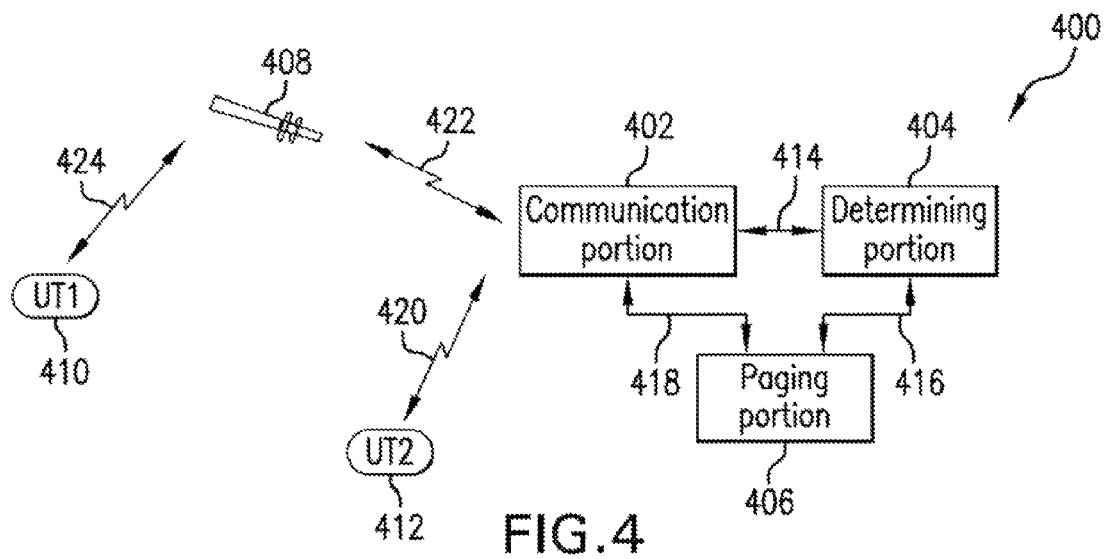
FIG. 4 illustrates a system 400 for enhanced paging, in accordance with an aspect of the invention.

A system for enhanced paging, in an embodiment of the present invention, is described with the help of FIG. 4.

FIG. 4 illustrates a system 400 for enhanced paging, in accordance with an aspect of the invention.

As illustrated in the figure, system 400 includes a communication portion 402, a determining portion 404, a paging portion 406, a satellite 408, a UT1 410 and a UT2 412. In this example, communication portion 402, determining portion 404, and paging portion 406 are distinct elements. However, in some embodiments, at least two of communication portion 402, determining portion 404, and paging portion 406 may be combined as a unitary element. In other embodiments, at least one of communication portion 402, determining portion 404, and paging portion 406 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Communication portion 402 is operable to bi-directionally communicate with UT2 412 via a network signal 420; bi-directionally communicate with satellite 408 via a network signal 422; bi-directionally communicate with determining portion 404 via a signal 414; and, bi-directionally communicate with paging portion 406 via a signal 418.

Satellite 408 bi-directionally communicates with UT1 410 via a network signal 424. In one embodiment, network signal 424 is similar to communication network signal 154.

In one embodiment, communication portion 402 receives network signal 420 via terrestrial network signal 152 and the data received by communication portion 402 corresponds to communication data for conversational class. In one embodiment, communication portion 402 uses SIP protocol to communicate with determining portion 404, and paging portion 406. In one embodiment, communication portion 402 provides traffic class information with the SIP message via signal 414 to determining portion 404.

Determining portion 404 receives the data from communication portion 402 and is operable to determine the type of data based on traffic class information provided by signal 414.

Paging portion 406 is operable to provide a paging signal to communication portion 402 via signal 418, based on the type of data provided by determining portion 404 via a signal 416. In one embodiment, if the traffic class is conversational class, amplitude of the paging signal is escalated by paging portion 406. In another embodiment, if the traffic class is conversational class, the waveform of the paging signal is changed by paging portion 406.

Communication portion 402 transmits the paging signal provided by paging portion 406 to satellite 408 via network signal 422, which forwards it to UT1 410 via network signal 424.

In one embodiment, communication portion 402 includes a P-CSCF that initiates a NRSPCA procedure to convey the traffic class to GGSN that may be part of determining portion 404. Furthermore, SGSN, and RAN may be part of paging portion 406, which can do enhanced paging based on the traffic class. This is further explained with the help of FIG. 5.

Figure 5:
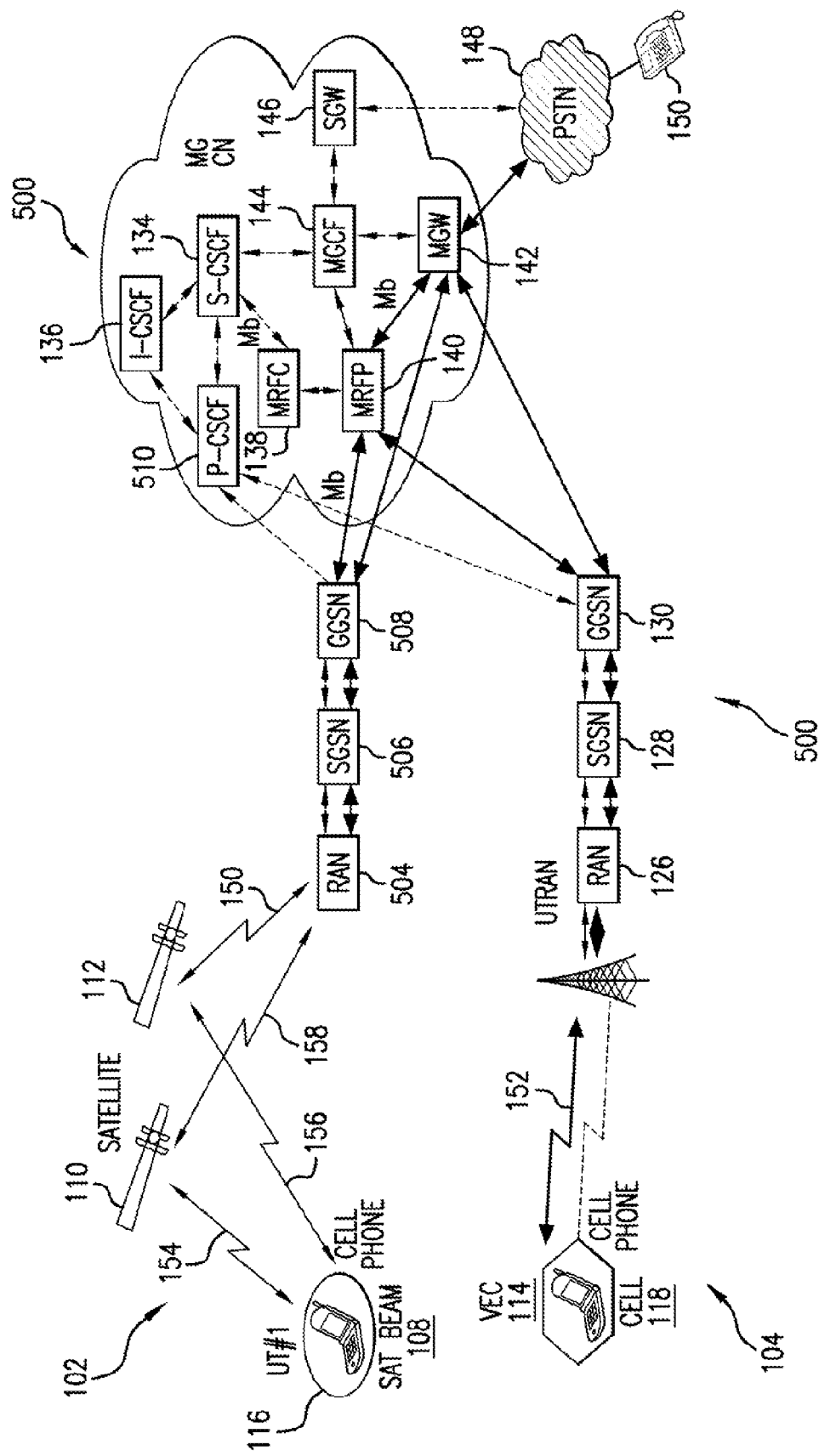
FIG. 5 illustrates a mobile satellite system 500, in accordance with an aspect of the invention.

FIG. 5 illustrates a mobile satellite system 500, in accordance with an aspect of the invention.

As illustrated in the figure, MSS 500 includes all the components of MSS 100 except some components of MS 100 are replaced by new components, in accordance with aspects of the invention. Mainly, IMS CN 106, RAN 120, SGSN 122, GGSN 124, and P-CSCF 132 of MSS 100 are replaced by an IMS CN 502, a RAN 504, a SGSN 506, a GGSN 508, and a P-CSCF 510 respectively in MSS 500.

As recommended by 3GPP, SIP messages between UT 116 and P-CSCF 510 are compressed, therefore, RAN 504, SGSN 506, and GGSN 508 are not able to examine the contents between UT 116 and P-CSCF 510. In one embodiment, NRSPCA procedure is utilized from P-CSCF 510 to GGSN 508, SGSN 506, and RAN 504 to convey the traffic class associated with the SIP signaling. When SIP INVITE containing SDP offer arrives at P-CSCF 510, P-CSCF 510 will trigger a series of steps among P-CSCF 510 and GGSN 508 to create request secondary PDP context activation for UT 116. This activation message, containing traffic class information, is sent to SGSN 506, so that SGSN 506 will know the traffic class associated with the incoming signaling.

If SGSN 506 has to page UT 116, SGSN 506 will indicate the traffic class in the Paging Cause. Hence, RAN 504 will be able to do enhanced paging if the Paging Cause indicates a conversational class. If SGSN 506 does not need to page UT 116, SGSN 506 will forward request secondary PDP context activation to UT 116 through RAN 504. In this case, if RAN 504 has to page UT 116, RAN 504 will be able to see the traffic class from request secondary PDP context activation. Hence RAN 504 can do enhanced paging if necessary, wherein the enhanced paging may include paging with a paging signal having a larger amplitude and/or paging with a paging signal having a different waveform than that of the original paging signal. Different components of MSS 500 work together, in accordance with aspects of the invention, to provide a method for enhanced paging and proper QoS establishment, which are described using FIGS. 6-13.

Figure 6:
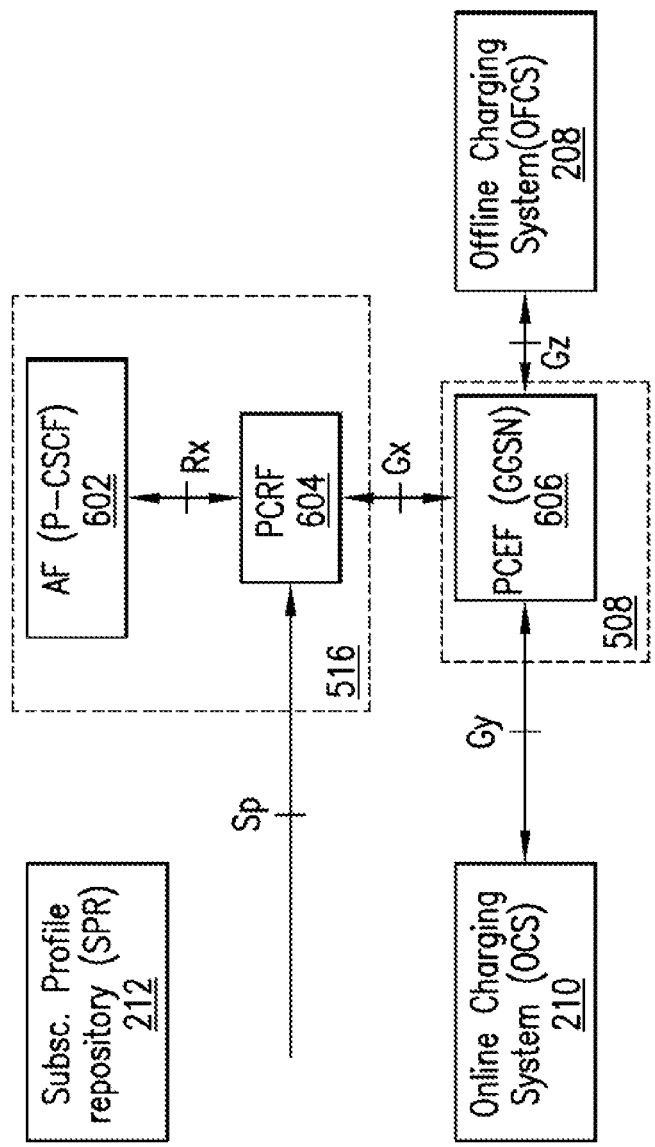
FIG. 6 illustrates an embodiment of PCC architecture 600, in accordance with an aspect of the invention.

FIG. 6 illustrates an embodiment of PCC architecture 600, in accordance with an aspect of the invention.

As illustrated in the figure, PCC architecture 600 includes an AF 602, a PCRF 604 and a PCEF 606, in addition to OFCS 208, OCS 210 and SPR 212 of typical PCC architecture 200.

Figure 2:
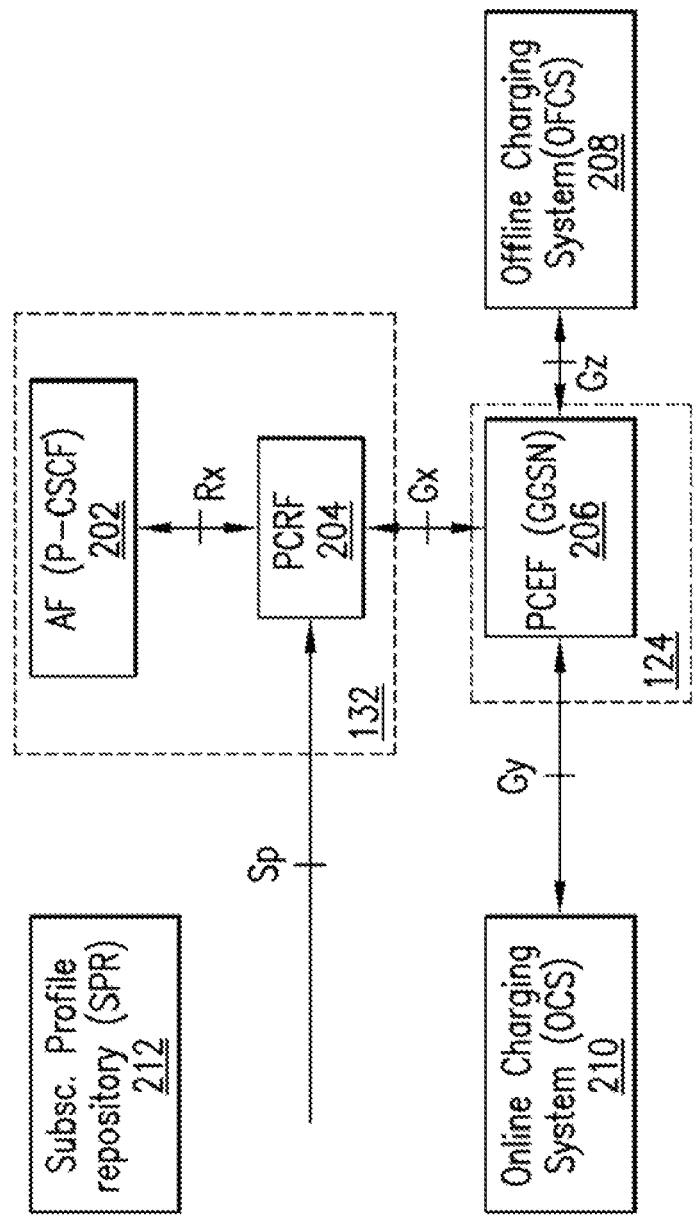
FIG. 2 illustrates an example of a typical PCC architecture.

AF 602 and PCRF 604 are part of P-CSCF 510. The basic functionality of AF 602 and PCRF 604 is similar to AF 202 and PCRF 204 respectively, as described with reference to FIG. 2. In addition to that, AF 602 and PCRF 604 are operable to follow NRSPCA procedure, in accordance with an aspect of the invention, in order to create PCC rules including the traffic class information for GGSN 508.

PCC rules are forwarded to PCEF 606, which is part of GGSN 508. PCEF 606 is operable to work with PCRF 604 in order to follow NRSPCA procedure, in accordance with an aspect of the invention, in addition to interfacing with OFCS 208 and OCS 210 for charging rules. PCRF 604 forwards the activation message containing traffic class information to GGSN 508 so that GGSN 508 will know the traffic class associated with the incoming signaling. NRSPCA procedure for incoming calls, in accordance with an aspect of the invention, is discussed with the help of FIGS. 7A-7B.

Figure 7A:
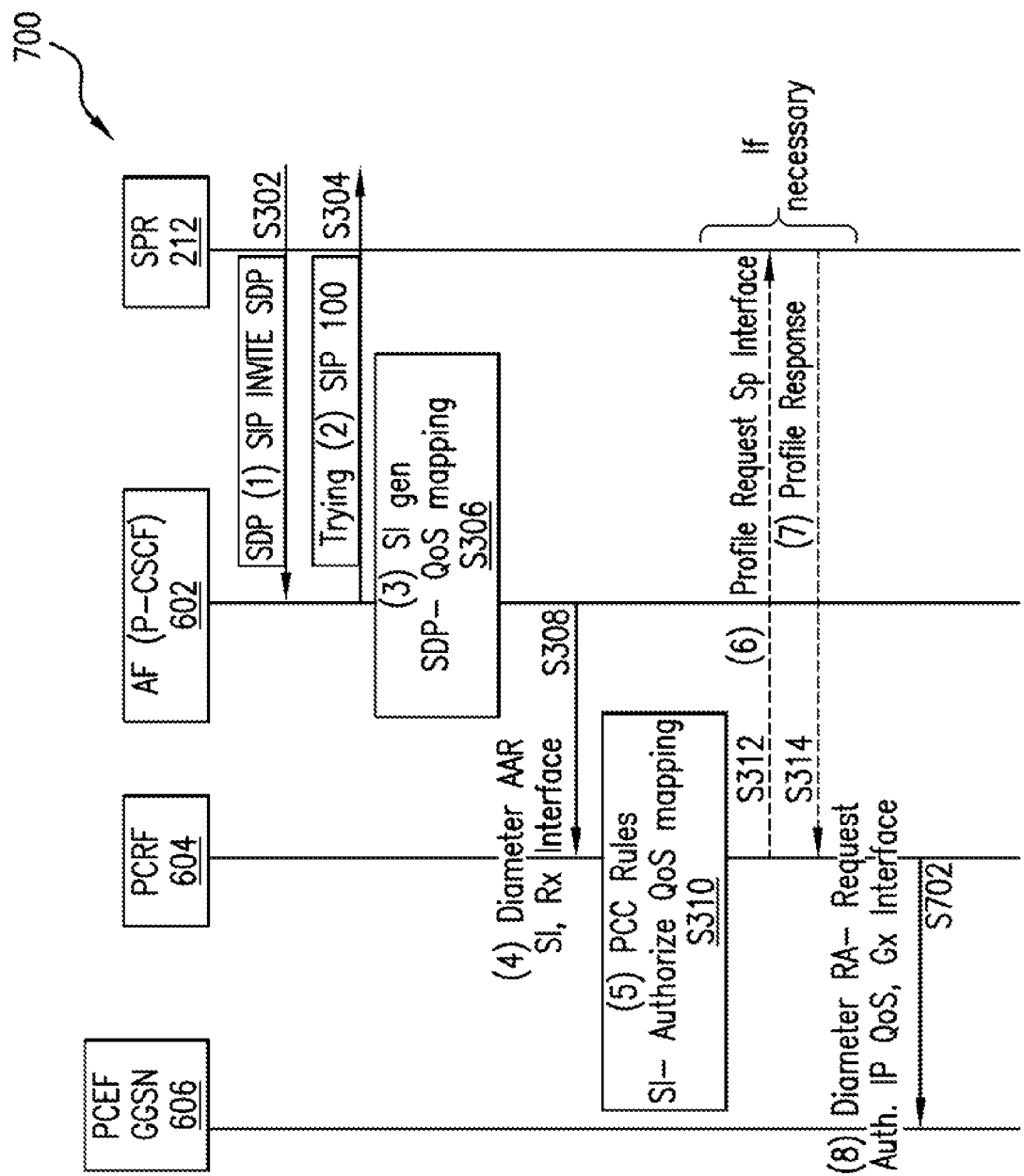
FIGS. 7A-7B illustrate NRSPCA procedure for incoming calls, in accordance with an aspect of the invention.
Figure 7B:
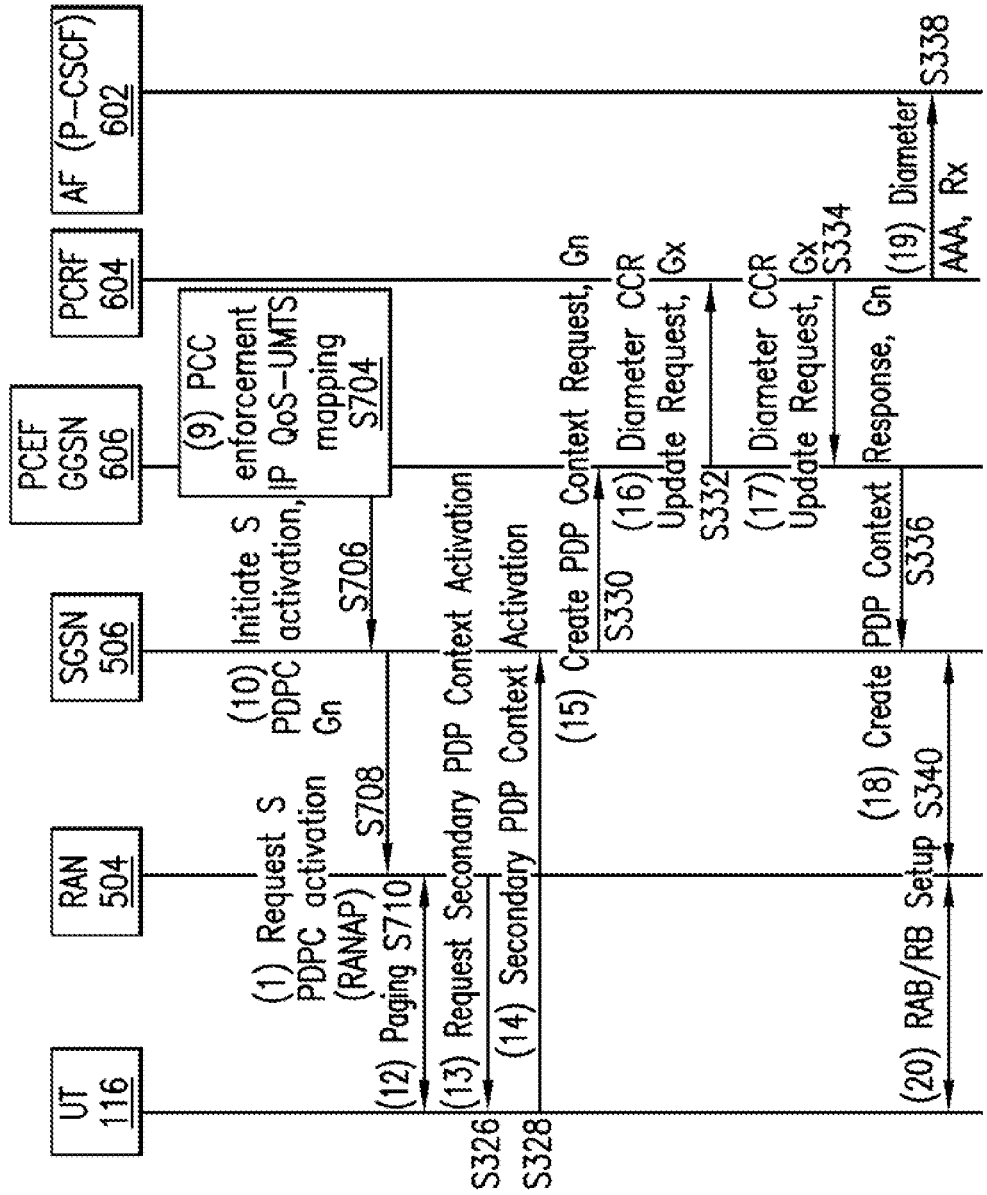

FIGS. 7A-7B illustrate NRSPCA procedure for incoming calls, in accordance with an aspect of the invention.

Figure 3A:
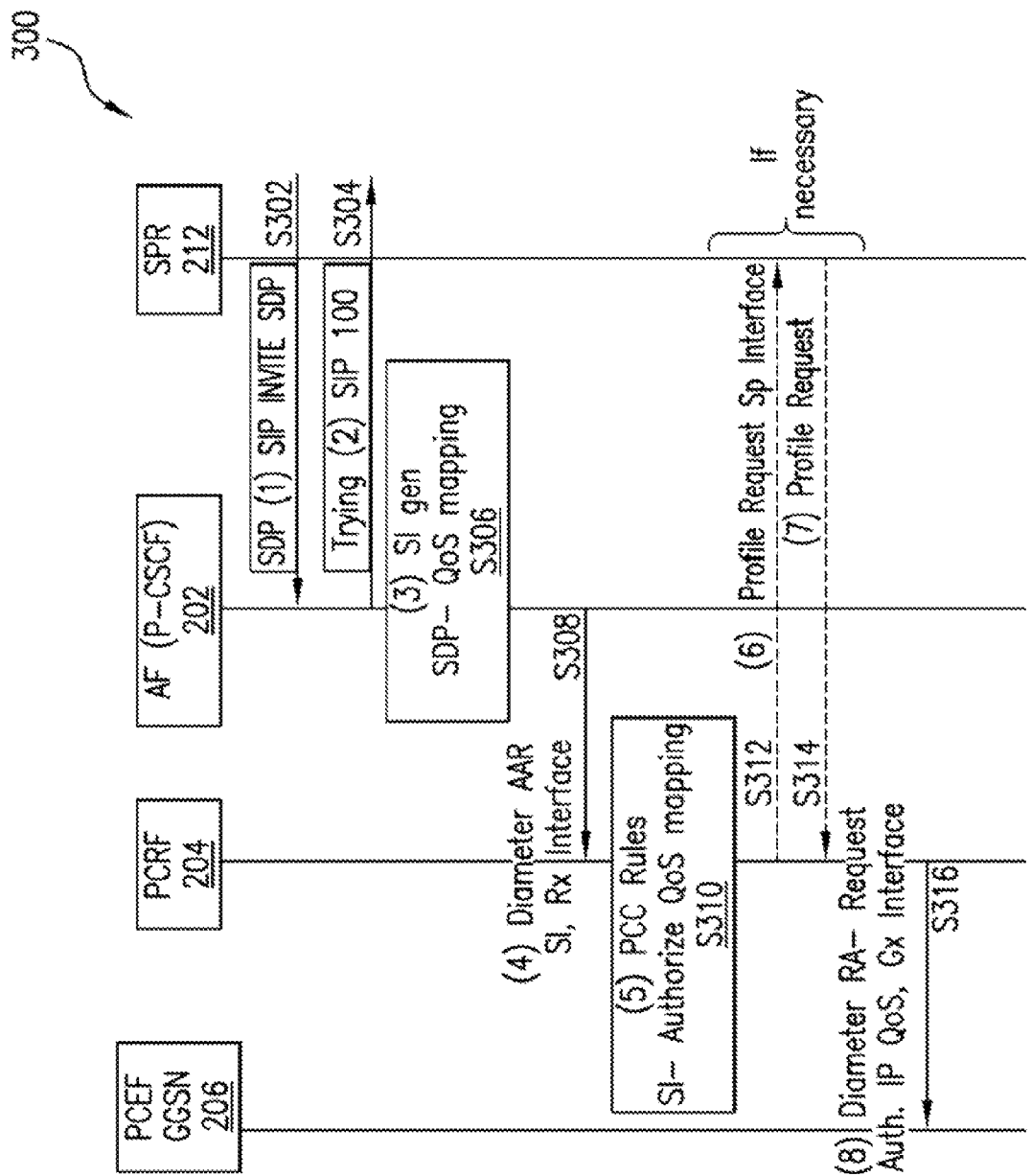
FIGS. 3A-3B illustrates NRSPCA procedure for incoming calls in MSS 100.

Steps 1-7 in FIG. 7A are same as the steps 1-7 in FIG. 3A, except that AF 202 is replaced by AF 602, PCRF 204 is replaced by PCRF 604 and PCEF 206 is replaced by PCEF 606. Step 8 has been modified to include traffic class in the QoS profile, in accordance with an aspect of the invention.

When SIP INVITE including SDP arrives at P-CSCF 510, with the destination of UT 116, P-CSCF 510 holds it. P-CSCF 510 then proceeds with NRSPCA procedure. Steps 3-7 illustrate the processes until PCC rules are decided and the call authorization is validated for the user, as discussed with reference to FIG. 3A.

If the call is authorized, PCRF 604 forwards the QoS mapping, including the traffic class, to PCEF 606, in accordance with an aspect of the invention (S702). The traffic class information can be used by SGSN 506 and GGSN 508 for enhanced paging if the paging cause indicates conversational class. Steps 9-20, in accordance with an aspect of the invention, are discussed with the help of FIG. 7B.

As illustrated in FIG. 7B, in step (9), PCC rules have been enforced and GGSN 508 has all the PCC rules in place. PCEF 606 performs end-to-end QoS mapping for IP—Universal Mobile Telecommunication System (UMTS) by providing QoS information elements that are most optimal across different applications (S704). PCEF 606 sends initiate secondary PDP context activation to SGSN 506 via $G_n$ interface of diameter protocol (S706).

Figure 3B:
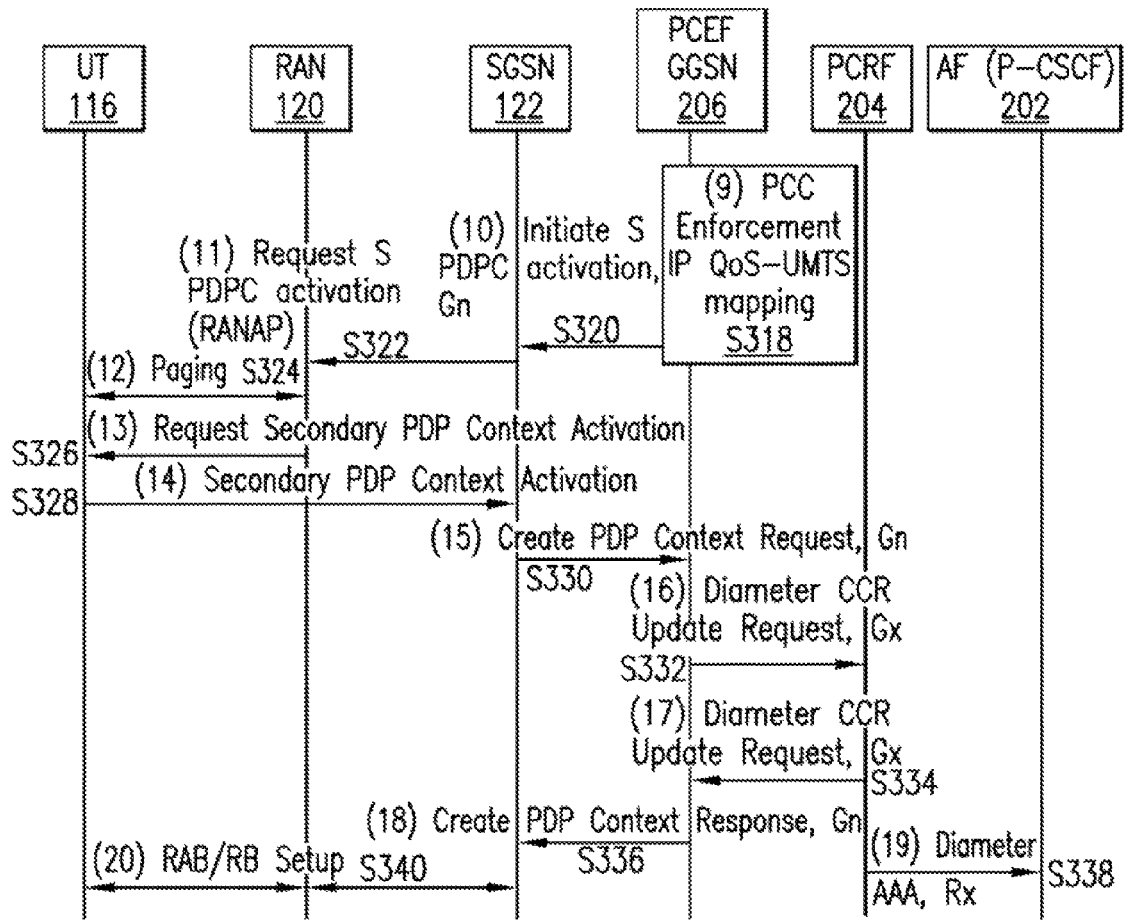

When UT 116 responds to the page, steps 13-20 are same as illustrated with reference to FIG. 3B.

Assuming UT 116 is in RRC-URA_PCH mode, SGSN 506 sends secondary PDP context activation request to UT 116 through RAN 504 (S708) in step (11).

At RAN 504, since UT 116 is in RRC-URA_PCH mode, request secondary PDP context activation will not be delivered yet. Instead, RAN 504 will page UT 116 (S710) in step (12). In one embodiment, if UT 116 does not respond to the page after a few pre-determined times, RAN 504 will elevate the paging level, as will be discussed with the help of FIGS. 8A-8B. It should be noted however, that the waveform of the paging signal may additionally or alternatively be modified.

Figure 8A:
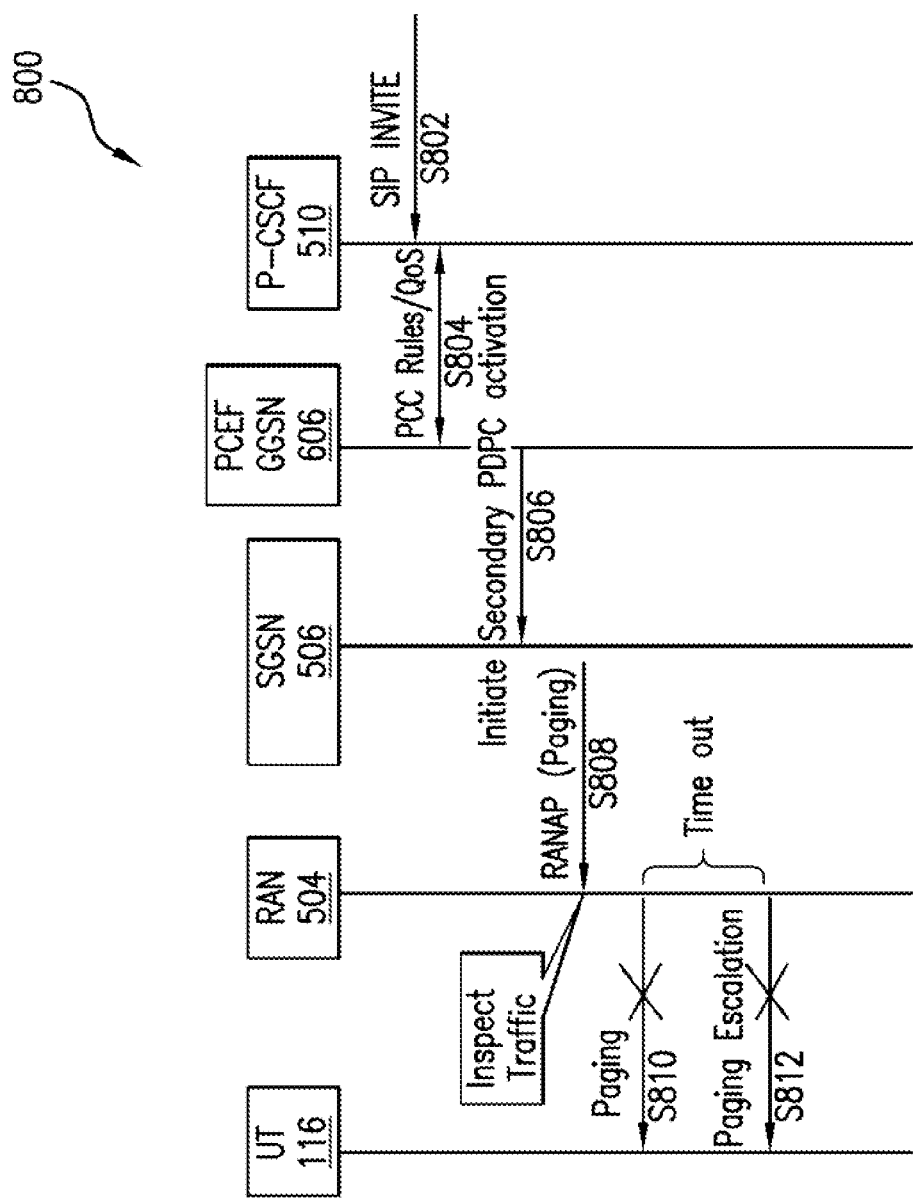
FIGS. 8A-8B illustrate enhanced paging using NRSPCA procedure, in accordance with an aspect of the invention, when a UT is in PMM-idle mode.
Figure 8B:
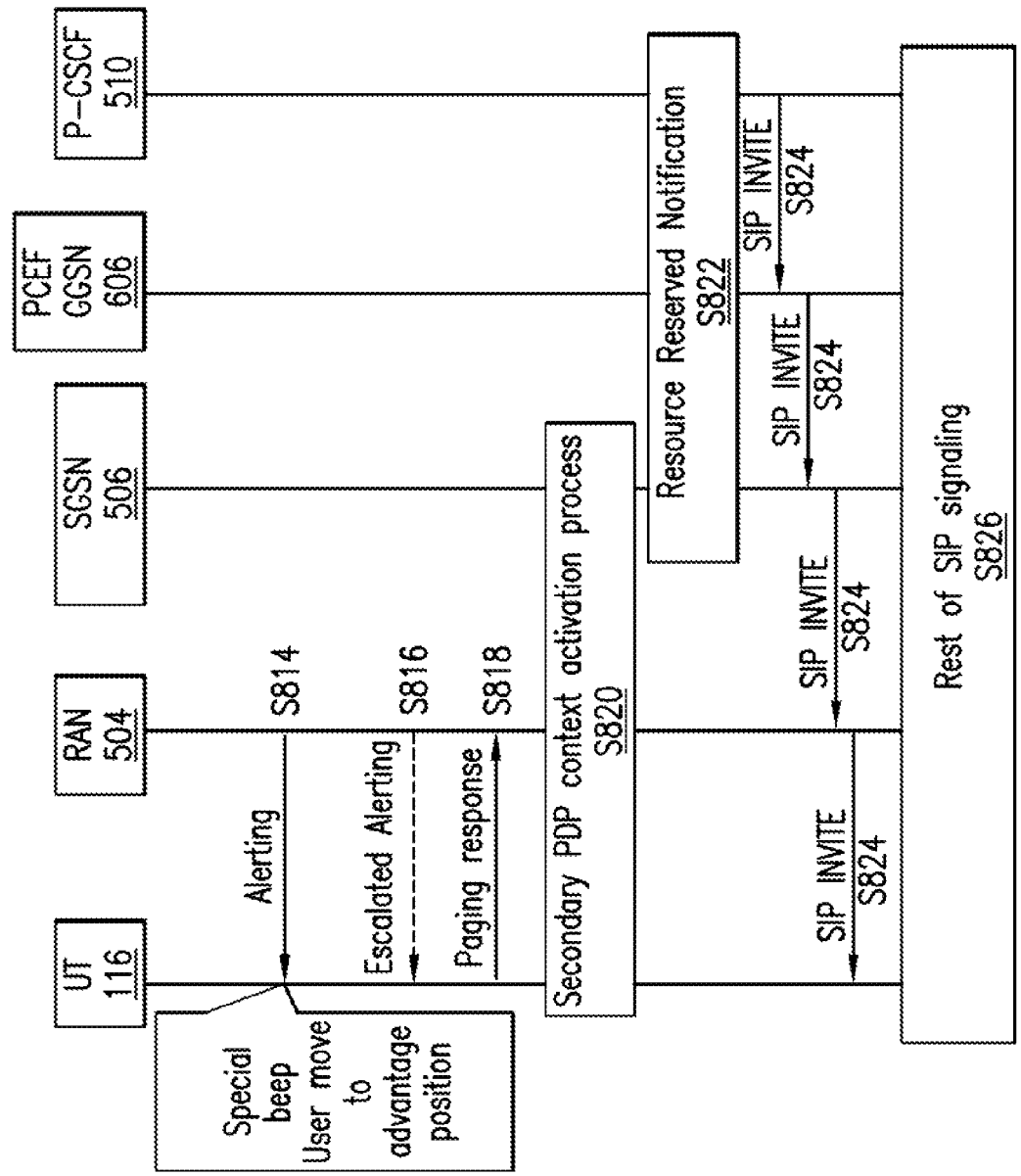

When a UT is in PMM-idle mode, enhanced paging using NRSPCA is described with the help of FIGS. 8A-8B.

FIGS. 8A-8B illustrate enhanced paging using NRSPCA procedure, in accordance with an aspect of the invention, when a UT is in PMM-idle mode.

As illustrated in FIG. 8A, SIP INVITE with SDP offer for voice call arrives at P-CSCF 510 (S802). P-CSCF 510 interacts with AF 602, PCRF 604, and PCEF 606 to generate PCC rules (S804), as discussed with reference to FIGS. 6, 7A-7B. Based on the PCC rules, PCEF 606 sends Initiate Secondary PDP context activation to SGSN 506 (S806).

Since UT 116 is in PMM-idle mode, SGSN 506 will page UT 116 through RAN 504 (S808). Page from SGSN 506 will have paging cause set to conversational class. When RAN 504 receives paging from SGSN 506 with paging cause set to conversational class, RAN 504 first will do normal paging in the area that UT 116 might be located (S810). When paging timer is expired without any response from UT 116, RAN 504 will do paging escalation meaning RAN 504 will expands the paging area. When there is still no response from UT 116, RAN 504 will do the enhanced paging (S812). Enhanced paging is a paging with higher power so that the paging signal can penetrate user in disadvantaged area. The steps after enhanced paging from RAN 504 are discussed with the help of FIG. 8B.

As illustrated in FIG. 8B, when UT 116 receives enhanced paging, it will notify the user using a special tone so that the user can move to a better reception area (S814). In some cases, escalated alerting is used for the special tone (S816). Once UT 116 responds to the enhanced paging (S818), the secondary PDP context activation is continued (S820). When the secondary PDP context has been established, i.e. UT 116 has the resources to conduct communication (S822), SIP INVITE will be sent to UT 116. Finally, UT 116 will exchange SIP messages with the calling party through P-CSCF 510 (S824). Rest of SIP signaling for SIP INVITE is not shown (S826).

Figure 9:
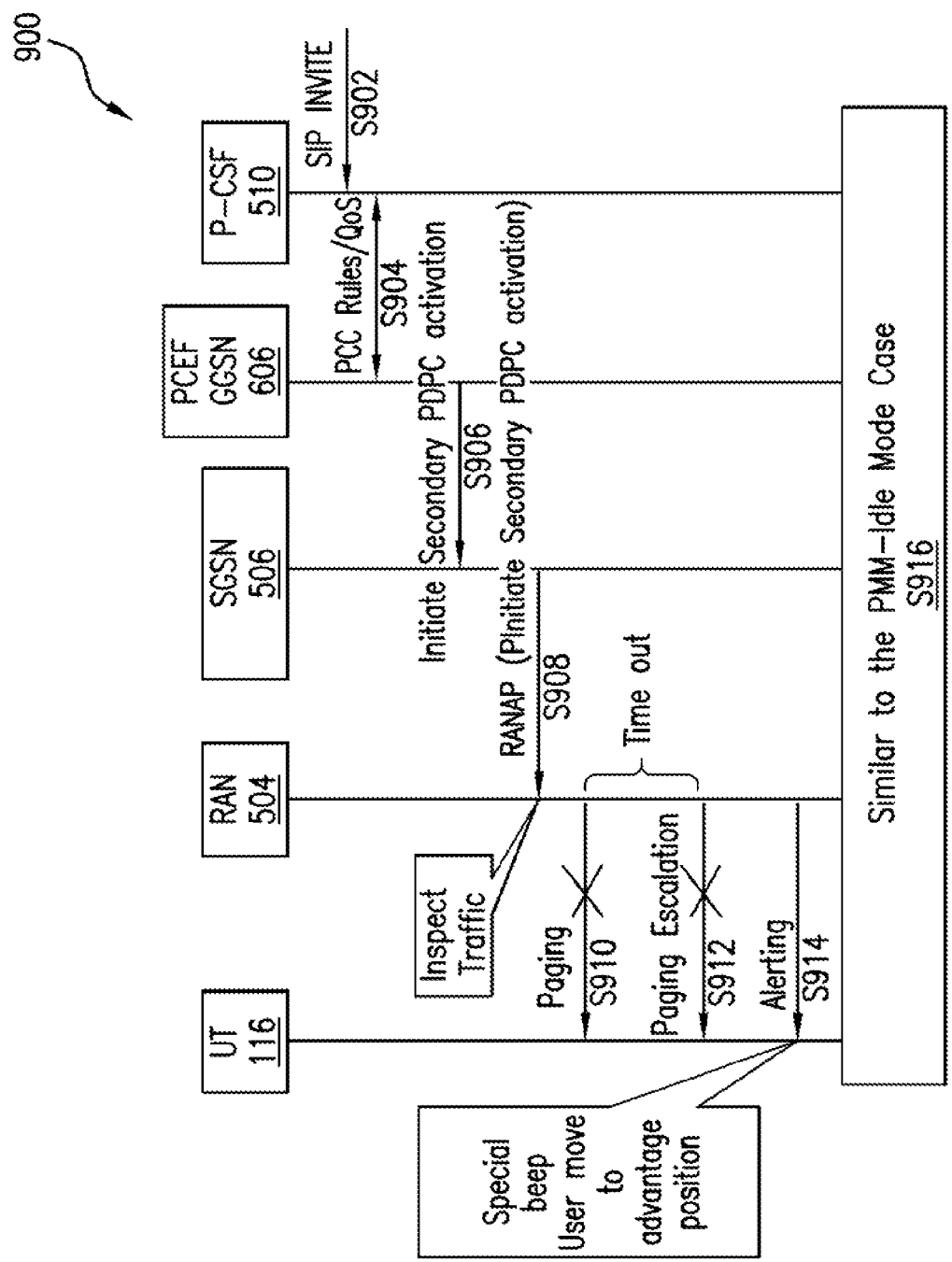
FIG. 9 illustrates enhanced paging using NRSPCA procedure, in accordance with an aspect of the invention, when a UT is in RRC-URA_PCH mode.

When a UT is in RRC-URA_PCH mode, enhanced paging using NRSPCA is described with the help of FIG. 9.

FIG. 9 illustrates enhanced paging using NRSPCA procedure, in accordance with an aspect of the invention, when a UT is in RRC-URA_PCH mode.

As illustrated in FIG. 9, SIP INVITE with SDP offer for voice call arrives at P-CSCF 510 (S902). P-CSCF 510 interacts with AF 602, PCRF 604, and PCEF 606 to generate PCC rules (S904), as discussed with reference to FIGS. 6, 7A-7B. Based on the PCC rules, PCEF 606 sends Initiate Secondary PDP context activation to SGSN 506 (S906).

In RRC-URA_PCH mode, UT 116 has established connection with SGSN 506 but RAN 504 has not allocated any resources yet. Thus SGSN 506 will forward the Initiate Secondary PCP context activation to UT 116 (S908). However, since RAN 504 has not allocated any resources yet, RAN 504 will not forward this message to UT 116, instead RAN 504 will page UT 116 (S910). When the paging fails, RAN 504 will do the enhanced paging (S912). When UT 116 receives enhanced paging, it will notify the user using a special beep so that the user can move to a better reception area (S914). When UT 116 responds to the enhanced paging, secondary PDP context activation proceeds as discussed for PMM-idle mode (S916). SIP messages are exchanged between UT 116 and the calling party via P-CSCF 510.

FIGS. 7A, 7B, 8A, 8B, and 9 illustrated an embodiment of the invention using NRSPCA procedures, where enhanced paging is achieved for conversational class by populating the QoS profile in the SIP message with the traffic class. Two different modes were discussed for incoming calls, where enhanced paging is activated based on the traffic class. In RRC-URA_PCH mode, the paging is initiated at the RAN. RAN is able to identify the traffic type of the incoming call from the request secondary PDP context activation that is sent by SGSN to the mobile terminal via RAN. In PMM-idle mode, the paging is initiated at the SGSN. For SGSN initiated paging, SGSN notifies RAN regarding the traffic type of this paging in the paging cause. Hence RAN can do enhanced paging if appropriate.

In another embodiment of the present invention, enhanced paging is achieved using a method known as Differentiated Services Code Point (DSCP). Use of DSCP field in the IP header for packet classification purposes is known in the art. In DSCP method, when P-CSCF observes that an incoming call is for traffic type that is eligible for enhanced paging, P-CSCF will mark this traffic with DSCP code. For example, P-CSCF will set the DSCP code to a fixed number to indicate the conversational class that will be known by the SDP being executed by SGSN and GGSN. SGSN can determine from the traffic type that this traffic is eligible for enhanced paging. Hence, for paging from SGSN, SGSN will populate the paging cause with enhanced paging cause code. For paging by RAN, RAN can escalate paging into enhanced paging by investigating the DSCP of the packet. The DSCP code will be chosen judiciously by network operator so that it will not disturb the network operation.

Figure 10:
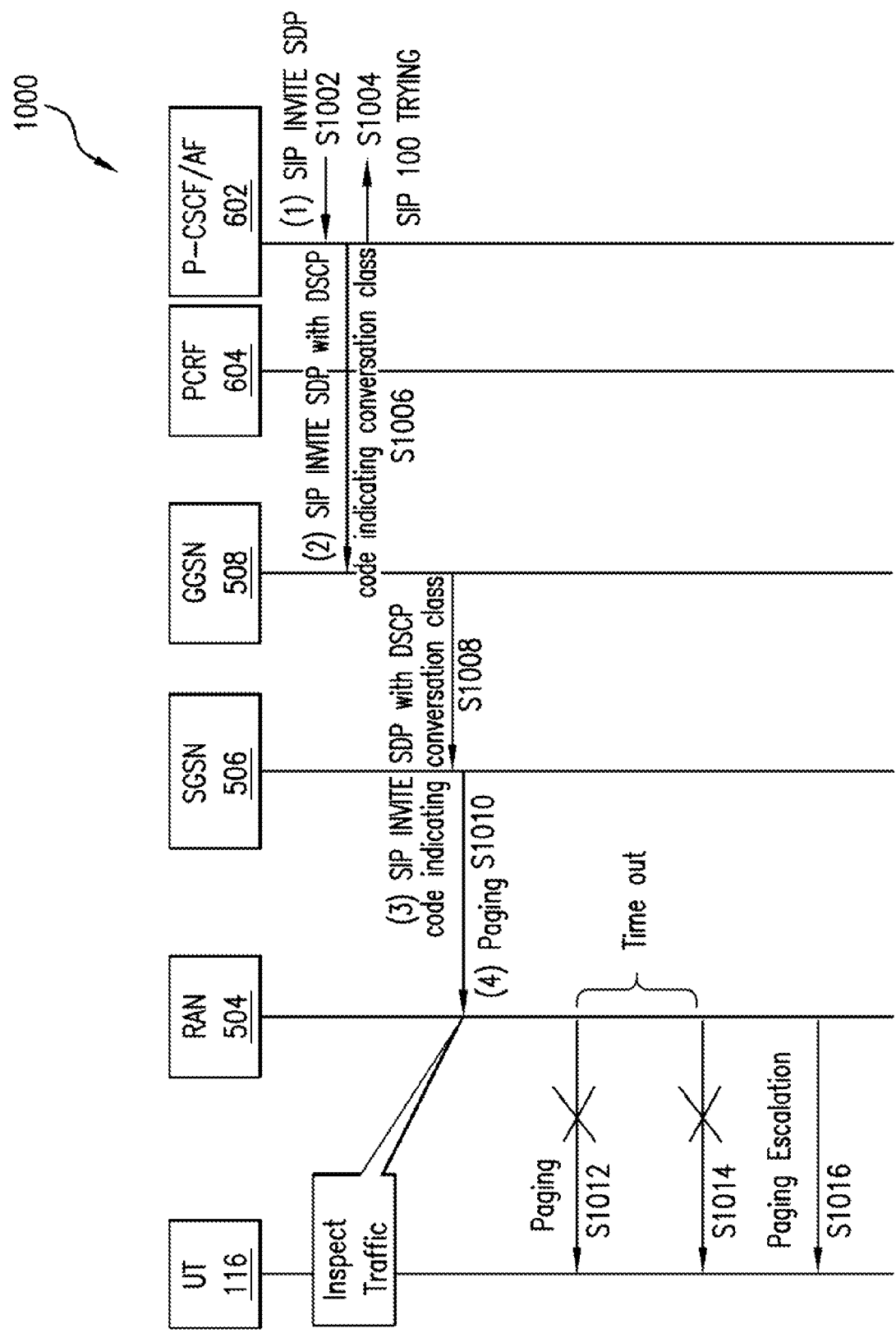
FIG. 10 illustrates a procedure for enhanced paging using DSCP, when UT is in PMM-idle mode, in accordance with an aspect of the invention.
Figure 11:
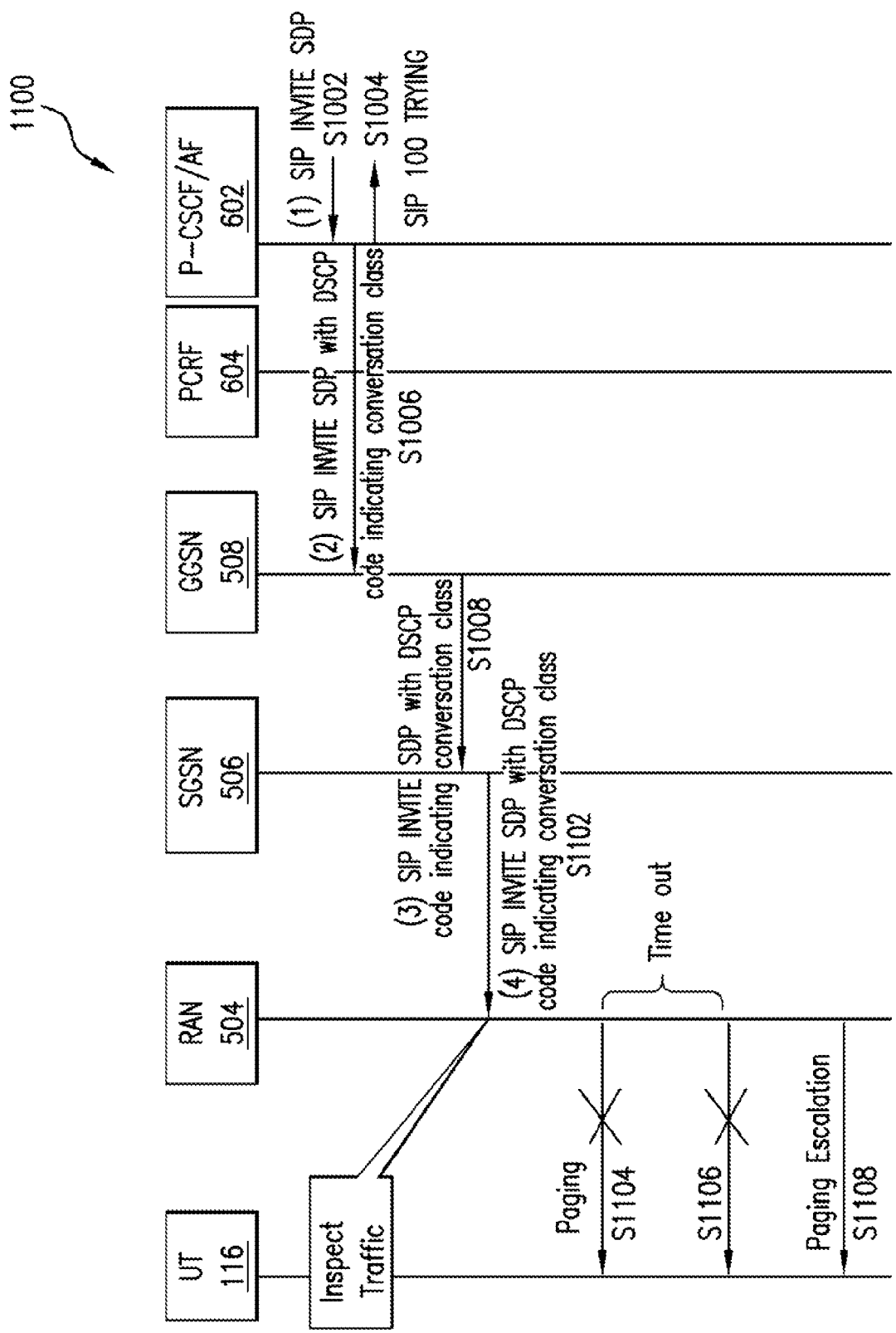
FIG. 11 illustrates a procedure for enhanced paging using DSCP, when UT is in RRC-URA_PCH mode, in accordance with an aspect of the invention.

The procedure for enhanced paging using DSCP, in an example embodiment of the invention, is discussed with the help of FIGS. 10-11.

FIG. 10 illustrates a procedure for enhanced paging using DSCP, when UT is in PMM-idle mode, in accordance with an aspect of the invention.

As illustrated in the figure, AF 602 receives SIP INVITE message indicating traffic that is eligible for enhanced paging (S1002). AF 602 indicates that SIP INVITE has been received by sending a SIP 100 message (S1004). AF 602 populates the DSCP with an appropriate code (for example, conversational class) and then sends it to GGSN 508 (S1006). GGSN 508 forwards the message to SGSN 506 (S1008). SGSN 506 sends paging to RAN 504 with paging cause indicating that this paging is eligible for enhanced paging (S1010). RAN 504 will page UT 116 (S1012). When paging timer expires without any response from UT 116 (S1014), RAN 504 will do paging escalation (S1016).

FIG. 11 illustrates a procedure for enhanced paging using DSCP, when UT is in RRC-URA_PCH mode, in accordance with an aspect of the invention.

As illustrated in the figure, for an SIP INVITE message indicating traffic that is eligible for enhanced paging, steps (S1002), (S1004), (S1006) and (S1008) are same as described with reference to FIG. 10, when UT is in PMM-idle mode.

When UT is in RRC-URA_PCH mode, SGSN 506 will send the SIP INVITE message to RAN 504 populated with the DSCP by AF 602 (S1102). RAN 504 will page UT 116 (S1104). When paging timer expires without any response from UT 116 (S1106), RAN 504 will do paging escalation (S1108).

As discussed with reference to FIGS. 10-11, in one example embodiment, enhanced paging can be achieved by marking the packet with an appropriate DSCP code, which is done by the P-CSCF. SGSN can populate the paging cause with enhanced paging code based on the DSCP code provided. Alternatively, RAN can escalate paging to enhanced paging by examining the DSCP code.

The methods described above with reference to FIGS. 4-11 provide method of achieving selective alerting using NRSPCA procedures for mobile terminated sessions by relying upon the QoS information element used in NRSPCA procedures for mobile terminated sessions.

Next, a method is discussed in an example embodiment, whereby NRSPCA procedure can be used to establish appropriate QoS attributes even for mobile originated sessions. Suppose there are calls from external device, e.g., a VoIP phone connected to UT or external fax machine connected to UT or external modem data connected to UT. In this case, the UT is typically unaware of the actual application being invoked from the external device and is therefore unable to invoke appropriate QoS attributes for the session. In this case, a method, in accordance with an aspect of the invention, is described by which NRSPCA will be applied from the core network to establish appropriate QoS for mobile originated sessions.

Figure 12A:
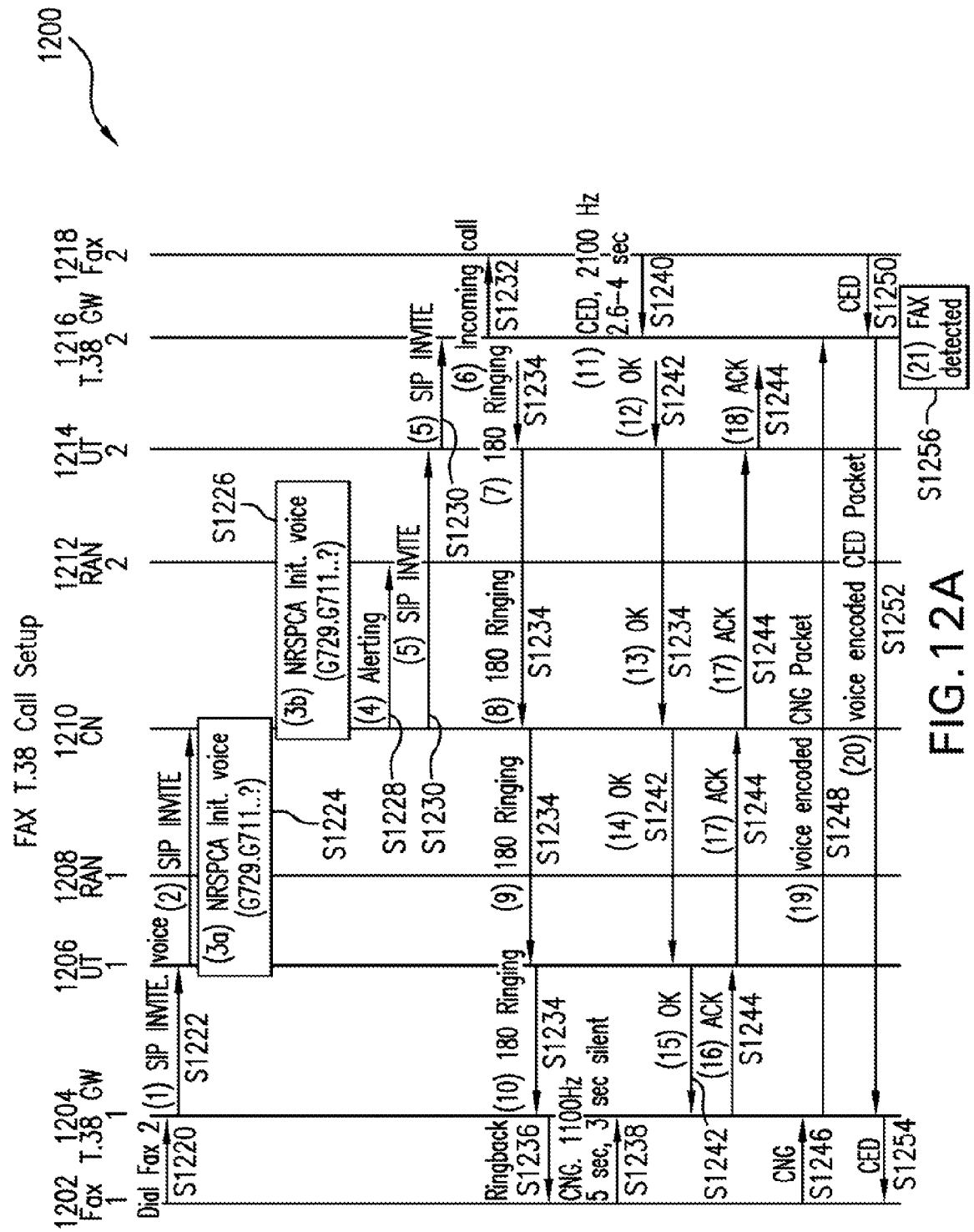
FIGS. 12A-12B illustrate NRSPCA procedure for Fax over IP (FoIP), in an example embodiment of the present invention.
Figure 12B:
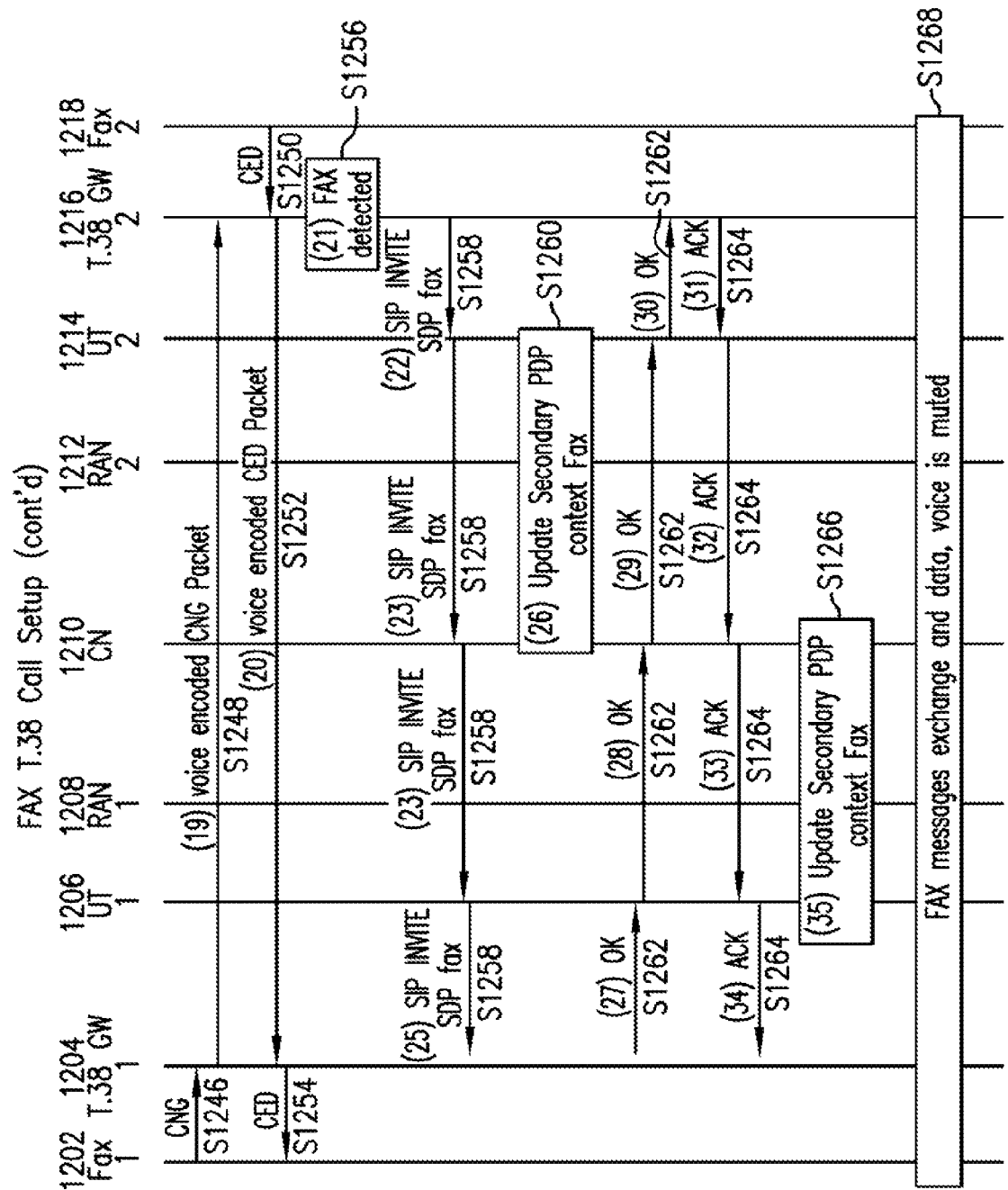

FIGS. 12A-12B illustrate NRSPCA procedure for FoIP, in an example embodiment of the present invention.

FIGS. 12A-12B illustrate an example embodiment of the invention for FoIP using T.38 protocol, which is an International Telecommunication Union (ITU) recommendation for allowing transmission of Fax over IP networks in real time. A Fax1 device 1202 initiates a fax transmission directed to a Fax2 device 1218 (S1220). An external fax T.38 gateway1 (GW1) 1204 starts fax call as voice call in an SIP INVITE (S1222). A UT1 1202 receives SIP INVITE but is unable to decipher the voice call since UT1 1202 is unaware of SIP INVITE. SIP INVITE is forwarded all the way to a CN 1210 (S1224). Note that CN 1210 includes SGSN, GGSN and IMS CN in an example embodiment. CN 1210 determines from SIP INVITE that this is a voice call and uses NRSPCA to reserve resources for voice call (S1226).

CN 1210 sends an alerting message to a RAN2 1212 (S1228) and forwards the SIP INVITE to a UT2 1214 (S1230).

UT2 1214 forwards the SIP INVITE to a GW2 1216 (S1232).

GW2 1216 sends a voice call to Fax2 1218. When fax2 1218 receives this call, it sends a ringing tone, which goes through UT2 1214, CN 1210, UT1 1202 to GW1 1204 (S1234). GW1 sends back a ringback tone to fax1 1202 (S1236).

Fax1 1202 sends a fax calling (CNG) tone to GW1 1204 once the dialing is complete (S1238). Fax2 1218 sends a CED signal after answering the call (S1240). GW2 1216 sends an OK signal through UT2 1214, CN 1210, UT1 1202 to GW1 1204 (S1242). In response to OK signal, GW1 1204 sends an ACK signal back to GW2 1216 (S1244).

Once the connection between fax1 1202 and fax2 1218 has been setup and they are communicating with each other, a fax calling tone (CNG) is sent (S1246). GW1 1204 sends a voice encoded CNG packet to GW2 1216 (S1248). Once GW2 1216 receives a CED signal from fax2 1218 (S1250), it sends a voice encoded CED packet to GW1 1204 (S1252). CED signal is forwarded to fax1 1202 (S1254). The remaining steps are discussed with the help of FIG. 12B.

In FIG. 12B, once GW2 1216 detects that this is a fax call (S1256), it sends SIP INVITE again (RE-INVITE) to indicate fax call (S1258). CN 1210 gets the SIP RE-INVITE and notices that the resources have to be updated. CN 1210 updates the resources for UT1 1206 using Modify secondary PDP context procedures (S1260).

GW1 1204 and GW2 1216 exchange OK signal (S1262) and ACK signal (S1264).

Resources for UT1 1206 are updated (S1266). Fax message and data is exchanged with muted voice (S1268).

Figure 13:
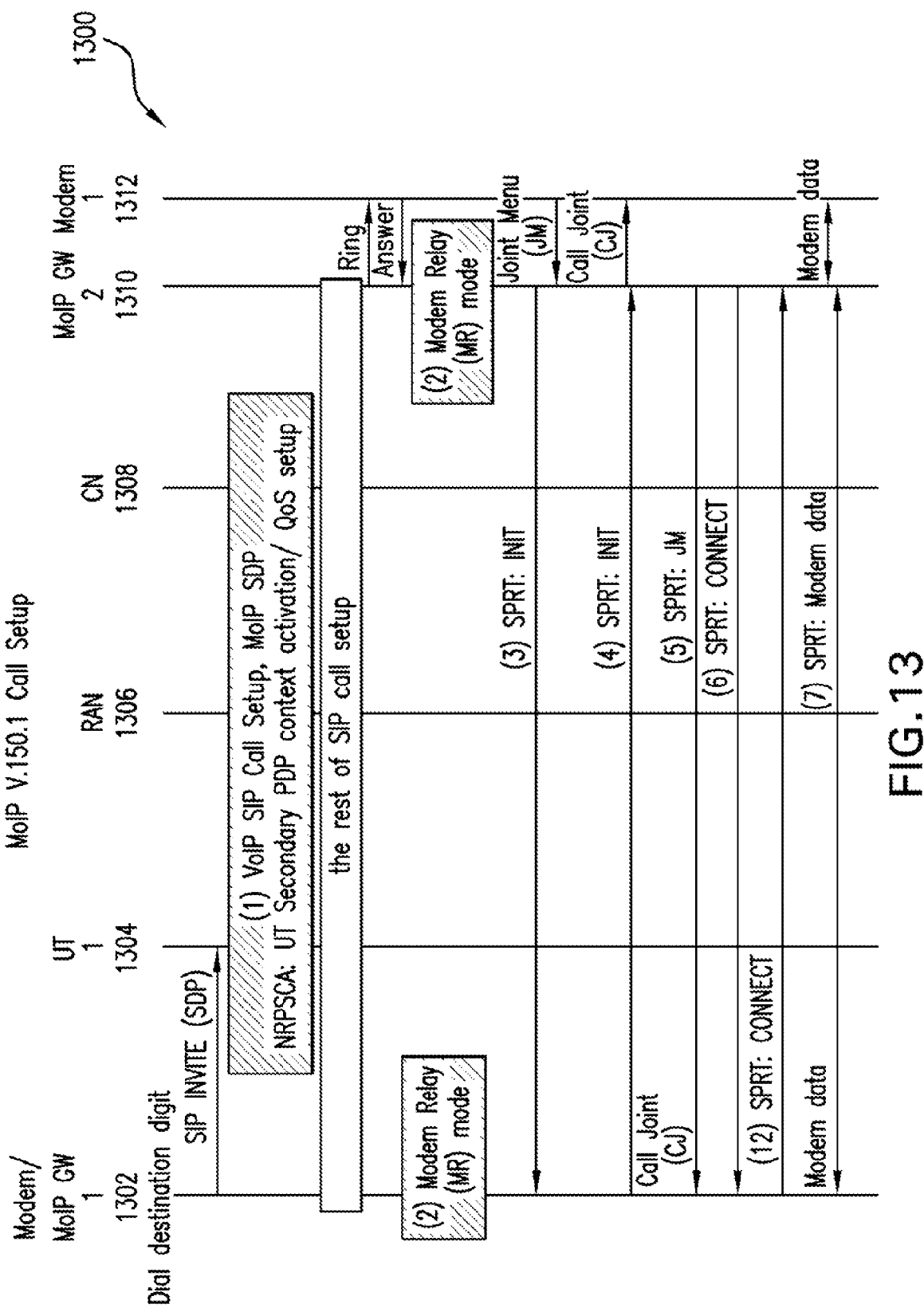
FIG. 13 illustrates a flow diagram for Modem over IP (MoIP), where the resource reservation is done using NRSPCA procedure, in an example embodiment of the present invention.

FIG. 13 illustrates a flow diagram for MoIP, where the resource reservation is done using NRSPCA procedure, in an example embodiment of the present invention.

MoIP Gateway follows ITU V.150.1 Modem over IP standard. FIG. 13 illustrates an example embodiment, when the modem has the capability as a MoIP Gateway. However, this method is also applicable when the modem is connected to a separate MoIP gateway.

When a destination number is dialed, a MoIP GW1 1302 sends SIP INVITE with SDP indicating modem call to a UT1 1304. When SIP INVITE arrives at a CN 1308, CN 1308 starts NRSPCA procedures. CN 1308 then forwards SIP INVITE to a destination modem 1312. The following are standard procedures to setup modem call.

As discussed with reference to FIGS. 12A-12B and 13, NRSPCA procedure can be used to establish appropriate QoS attributes for mobile originated sessions, for example, FoIP and MoIP, in accordance with aspects of the invention. Since fax or modem data calls from external devices attached to UT do not have the ability to request resources, proposed NRSPCA procedure provides resources to such calls.

A system and method to enable the enhanced paging for 3GPP IMS based Mobile Satellite Communication was discussed, in accordance with aspects of the invention. When SIP INVITE containing SDP offer arrives at P-CSCF, P-CSCF triggers a series of steps among P-CSCF (AF), PCRF, and PCEF (GGSN) to create request secondary PDP context activation for UT. The activation message, containing traffic class information, is sent to SGSN, so that SGSN knows the traffic class associated with the incoming signaling. If SGSN has to page the UT, SGSN indicates the traffic class in the Paging Cause. Hence RAN is able to do enhanced paging if the Paging Cause is indicating conversational class. If SGSN does not need to page UT, SGSN forwards request secondary PDP context activation to UT through RAN. In this case, if RAN has to page UT, RAN is able to see the traffic class from request secondary PDP context activation. Hence RAN can do enhanced paging if necessary.

While the description and illustrations discussed in this application refer to 3GPP specifications and procedures, this concept of Alerting and QoS Establishment can also be applied to non-3GPP systems and satellite systems that are in Medium Earth Orbit (MEO), Low Earth Orbit (LEO) or Geosynchronous (GEO) orbits.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radio access network (RAN) node apparatus of a mobile telecommunications network comprising:
   at least one processor; and
   at least one memory including computer program code for one or more programs,
   the at least one memory and the computer program code configured to, with the at least one processor, cause the apparatus to perform at least the following:
   receive a request message for initiation of a communications session with a mobile terminal serviced by the RAN node, wherein the request message comprises one of a packet data protocol (PDP) context initiation message and a session initiation protocol (SIP) message received from a serving general packet radio service support node (SGSN) of the mobile telecommunications network;
   determine a priority level associated with the communications session based on service information reflected by the request message, and determine that the priority level is pre-designated for high priority alerting;
   determine occurrence of a paging procedure timeout based on a lack of receipt of a response to a paging signal transmitted to the mobile terminal; and
   initiate a high penetration alerting procedure based on the paging timeout and the determination that the priority level associated with the communications session is designated for the high priority alerting, wherein the high penetration alerting procedure is configured for a higher probability of reaching the mobile terminal than that of the paging procedure.

2. The RAN node apparatus of claim 1, wherein the determination of the priority level associated with the communications session is based on one or more of a requested quality of service level and an indicated service class for the communications session.

3. The RAN node apparatus of claim 2, wherein the one or more of the requested quality of service level and the indicated service class for the communications session are reflected by a differentiated services code point (DSCP) field of the SIP message.

4. The RAN node apparatus of claim 1, wherein the high penetration alerting procedure comprises one or more of a modification of a waveform of the paging signal and an increase in power of the paging signal, to address link margin issues when the mobile terminal is located in a disadvantaged or signal attenuating location.

5. The RAN node apparatus of claim 1, wherein the apparatus is caused to further perform the following:
   upon the determination of the occurrence of the paging procedure timeout, initiate an escalated paging procedure; and
   determine occurrence of an escalated paging procedure timeout based on a lack of receipt of a response to an escalated paging signal transmitted to the mobile terminal; and
   wherein the high penetration alerting procedure is based on the escalated paging timeout and the determination that the priority level associated with the communications session is designated for the high priority alerting.

6. The RAN node apparatus of claim 1, wherein the apparatus is caused to further perform the following:
   determine occurrence of a timeout of the high penetration alerting procedure based on a lack of receipt of a response to a high penetration alerting signal transmitted to the mobile terminal; and
   initiate an escalated high penetration alerting procedure based on the high penetration alerting procedure timeout, wherein the escalated high penetration alerting procedure is configured for a higher probability of reaching the mobile terminal than that of the high penetration alerting procedure.

7. A method comprising:
   receiving, by a radio access network (RAN) node of a mobile telecommunications network, a request message for initiation of a communications session with a mobile terminal serviced by the RAN node, wherein the request message comprises one of a packet data protocol (PDP) context initiation message and a session initiation protocol (SIP) message received from a serving general packet radio service support node (SGSN) of the mobile telecommunications network;
   determining, by the RAN node, a priority level associated with the communications session based on service information reflected by the request message, and determining that the priority level is pre-designated for high priority alerting;
   determining occurrence of a paging procedure timeout based on a lack of receipt of a response to a paging signal transmitted to the mobile terminal; and
   initiating, by the RAN node, a high penetration alerting procedure based on the paging timeout and the determination that the priority level associated with the communications session is designated for the high priority alerting, wherein the high penetration alerting procedure is configured for a higher probability of reaching the mobile terminal than that of the paging procedure.

8. The method of claim 7, wherein the determination of the priority level associated with the communications session is based on one or more of a requested quality of service level and an indicated service class for the communications session.

9. The method of claim 8, wherein the one or more of the requested quality of service level and the indicated service class for the communications session are reflected by a differentiated services code point (DSCP) field of the SIP message.

10. The method of claim 7, wherein the high penetration alerting procedure comprises one or more of modifying a waveform of the paging signal and increasing power of the paging signal, to address link margin issues when the mobile terminal is located in a disadvantaged or signal attenuating location.

11. The method of claim 7, further comprising:
    upon the determination of the occurrence of the paging procedure timeout, initiating an escalated paging procedure; and
    determining occurrence of an escalated paging procedure timeout based on a lack of receipt of a response to an escalated paging signal transmitted to the mobile terminal; and
    wherein the high penetration alerting procedure is based on the escalated paging timeout and the determination that the priority level associated with the communications session is designated for the high priority alerting.

12. The method of claim 7, further comprising:
    determining occurrence of a timeout of the high penetration alerting procedure based on a lack of receipt of a response to a high penetration alerting signal transmitted to the mobile terminal; and
    initiating an escalated high penetration alerting procedure based on the high penetration alerting procedure timeout, wherein the escalated high penetration alerting procedure is configured for a higher probability of reaching the mobile terminal than that of the high penetration alerting procedure.

* * * * *